US009598622B2

(12) United States Patent
Formato et al.

(10) Patent No.: US 9,598,622 B2
(45) Date of Patent: *Mar. 21, 2017

(54) GEL COMPRISING A PHASE-CHANGE MATERIAL, METHOD OF PREPARING THE GEL, THERMAL EXCHANGE IMPLEMENT COMPRISING THE GEL, AND METHOD OF PREPARING THE THERMAL EXCHANGE IMPLEMENT

(71) Applicant: Cold Chain Technologies, Inc., Holliston, MA (US)

(72) Inventors: Richard M. Formato, Grafton, MA (US); Dimitrios P. Bakllas, Worcester, MA (US); Amrut N. Biswal, Boston, MA (US)

(73) Assignee: COLD CHAIN TECHNOLOGIES, INC., Holliston, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/225,589

(22) Filed: Mar. 26, 2014

(65) Prior Publication Data
US 2014/0290285 A1    Oct. 2, 2014

Related U.S. Application Data

(63) Continuation-in-part of application No. 14/036,497, filed on Sep. 25, 2013.
(Continued)

(51) Int. Cl.
 *C08K 5/01* (2006.01)
 *C09K 5/06* (2006.01)
(Continued)

(52) U.S. Cl.
 CPC ............. *C09K 5/063* (2013.01); *C09K 5/06* (2013.01); *C08K 5/01* (2013.01); *C08L 9/00* (2013.01); *C08L 9/06* (2013.01); *C08L 15/00* (2013.01)

(58) Field of Classification Search
 CPC ..... C08K 5/01; C08L 9/06; C08L 9/00; C08L 15/00; C09K 5/06
(Continued)

(56) References Cited

U.S. PATENT DOCUMENTS 3,424,733 A    1/1969   Pollock
4,764,535 A    8/1988   Leicht
(Continued)

FOREIGN PATENT DOCUMENTS

CN    101423749 A  * 11/2007   ............... C09K 5/06
EP    1329433 A1    7/2003
(Continued)

OTHER PUBLICATIONS

Machida et al., "Aggregation Behavior of the Styrene Units in Oil Gel of Styrene-Butadiene-Styrene Triblock Copolymer," Nihon Reoroji Gakkaishi, 37(1):25-29 (2009).
(Continued)

*Primary Examiner* — Rip A Lee
(74) *Attorney, Agent, or Firm* — Kriegsman & Kriegsman

(57) ABSTRACT

Gel including a phase-change material and a gelling agent. In one embodiment, the phase-change material may be n-tetradecane, n-hexadecane or mixtures thereof. The gelling agent may be a high molecular weight styrene-ethylene-butylene-styrene (SEBS) triblock copolymer with a styrene:rubber ratio of about 30:70 to 33:67% by weight. To form the gel, the phase-change material and the gelling agent may be mixed at an elevated temperature relative to room temperature to partially, but not completely, dissolve the gelling
(Continued)

agent. The mixture may then be cooled to room temperature. Alternatively, the phase-change material and the gelling agent may be mixed at room temperature, and the mixture may then be heated to form a viscoelastic liquid, which is then cooled to room temperature. The invention is also directed at a method of preparing the gel, a thermal exchange implement including the gel, and a method of preparing the thermal exchange implement.

46 Claims, 10 Drawing Sheets

Related U.S. Application Data

(60) Provisional application No. 61/705,293, filed on Sep. 25, 2012.

(51) Int. Cl.
  *C08L 15/00* (2006.01)
  *C08L 9/06* (2006.01)
  *C08L 9/00* (2006.01)
(58) Field of Classification Search
  USPC ........ 524/487, 490, 474, 574, 571, 575, 476
  See application file for complete search history.

(56) References Cited

U.S. PATENT DOCUMENTS

| | | | |
|---|---|---|---|
| 4,797,160 A | 1/1989 | Salyer | |
| 4,822,653 A | 4/1989 | Kauffman et al. | |
| 5,026,787 A * | 6/1991 | Takagi et al. | 525/391 |
| 5,112,900 A | 5/1992 | Buddenhagen | |
| 5,390,791 A | 2/1995 | Yeager | |
| RE34,880 E | 3/1995 | Salyer | |
| 5,508,334 A | 4/1996 | Chen | |
| 5,618,882 A * | 4/1997 | Hammond et al. | 525/92 D |
| 5,718,835 A * | 2/1998 | Momose et al. | 252/73 |
| 5,770,295 A | 6/1998 | Alderman | |
| 5,994,450 A | 11/1999 | Pearce | |
| 6,271,283 B1 | 8/2001 | Shimada et al. | |
| 6,340,467 B1 | 1/2002 | Morrison | |
| 6,413,458 B1 | 7/2002 | Pearce | |
| 6,433,068 B1 * | 8/2002 | Morrison et al. | 524/505 |
| 6,517,648 B1 | 2/2003 | Bouchette et al. | |
| 6,574,971 B2 | 6/2003 | Suppes | |
| 6,723,776 B2 * | 4/2004 | Sakaki et al. | 524/474 |
| 6,869,441 B2 * | 3/2005 | Agarwal et al. | 607/114 |
| 6,881,776 B2 * | 4/2005 | Butuc | 524/284 |
| 7,105,104 B2 | 9/2006 | Chomard et al. | |
| 7,138,079 B2 | 11/2006 | Pearce | |
| 7,294,374 B2 | 11/2007 | Romero | |
| 7,320,770 B2 * | 1/2008 | Chomard | B01J 13/0065 252/70 |
| 7,550,534 B2 * | 6/2009 | Zhao et al. | 525/88 |
| 7,625,967 B2 | 12/2009 | St. Clair | |
| 7,714,081 B2 | 5/2010 | Sera et al. | |
| 7,771,633 B2 | 8/2010 | Burns et al. | |
| 7,829,073 B2 | 11/2010 | Martin et al. | |
| 7,919,163 B2 | 4/2011 | Romero | |
| 7,964,664 B2 | 6/2011 | Pearce | |
| 7,994,256 B2 | 8/2011 | St. Clair | |
| 8,618,205 B2 * | 12/2013 | Shimakage | C08L 53/025 524/487 |
| 2002/0049276 A1 | 4/2002 | Zwick | |
| 2004/0072949 A1 | 4/2004 | Ding et al. | |
| 2004/0076826 A1 | 4/2004 | Lee | |
| 2005/0004274 A1 | 1/2005 | Healy et al. | |
| 2006/0124892 A1* | 6/2006 | Rolland et al. | 252/70 |
| 2007/0000484 A1 | 1/2007 | Magill et al. | |
| 2007/0238835 A1 | 10/2007 | Chen | |
| 2008/0168595 A1 | 7/2008 | Almqvist | |
| 2008/0203105 A1 | 8/2008 | Trotman et al. | |
| 2009/0232753 A1 | 9/2009 | Healy et al. | |
| 2011/0124784 A1 | 5/2011 | Kross | |
| 2011/0243985 A1 | 10/2011 | Pagani et al. | |
| 2011/0248208 A1 | 10/2011 | Rolland et al. | |
| 2011/0281485 A1 | 11/2011 | Rolland et al. | |
| 2012/0100089 A1 | 4/2012 | Barba et al. | |
| 2012/0208959 A1 | 8/2012 | Mueller et al. | |
| 2014/0087105 A1 | 3/2014 | Formato et al. | |

FOREIGN PATENT DOCUMENTS

| | | | | |
|---|---|---|---|---|
| EP | 1838802 A2 | 10/2007 | | |
| EP | 2181694 A1 | 5/2010 | | |
| EP | 2261297 A2 | 12/2010 | | |
| KR | 930009901 B1 | 10/1993 | | |
| KR | 20030041891 A | 5/2003 | | |
| WO | 9105014 A1 | 4/1991 | | |
| WO | 0122779 A1 | 3/2001 | | |
| WO | 03057795 A1 | 7/2003 | | |
| WO | 2007040395 A1 | 4/2007 | | |
| WO | 2011078340 A1 | 6/2011 | | |
| WO | WO 2011/078340 A1 * | 6/2011 | | C09K 5/06 |
| WO | 2011094094 A1 | 8/2011 | | |

OTHER PUBLICATIONS

Watanabe et al., "Rheology of Styrene-Butadiene-Styrene Triblock Copolymer in n-Tetradecane Systems," Journal of Rheology, 28(4):393-409 (1984).
Kraton Styrenic Block Copolymers in Oil Gels Fact Sheet, Kraton Perfomance Polymers, Inc., Houston, TX (2000).
PlusICE High Loading Organic Rubber Development, www.pcmproducts.net, Phase Change Material Products Limited, Cambridgeshire, UK (2012).
Abstract of Xiao et al., "Preparation and performance of shape stabilized phase change thermal storage materials with high thermal conductivity," Energy Conversion and Management, 43(1)103-8 (2002).
Abstract of Royon et al., "Investigation on heat transfer properties of slurry of stabilized paraffin during a melting process," Energy Conversion and Management, 52(2):1073-6 (2011).
Abstract of Chantawansri et al., "Phase behavior of SEBS triblock copolymer gels," Journal of Polymer Science Part B: Polymer Physics, 49(20):1479-91 (2011).
Abstract of Kim et al., "Influence of Hydrocarbon Oils on the Physical Gelation of Poly(styrene-b-(ethylene-co-butylene)-b-styrene) (SEBS) Triblock Copolymers," Journal of Elastomers and Plastics, 39(2):133-50 (2007).
Abstract of Sato et al., "Thermoreversible Physical Gelation of Block Copolymers in a Selective Solvent," Macromolecules, 33(5):1686-91 (2000).
Abstract of Zhang et al., "Silica encapsulation of n-octadecane via sol-gel process: a microencapsulated phase-change material with enhanced conductivity and performance," Journal of Colloid and Interface Science, 343(1)246-55 (2010).
Sharma et al., "Review on thermal energy storage with phase change materials and applications," Renewable and Sustainable Energy Reviews, 13:318-45 (2009).
Lyut et al., "Phase change materials formed by uv curable epoxy matrix and Fischer-Tropsch paraffin wax," Energy Conversion and Management, 50:57-61 (2009).
International Search Report dated Apr. 15, 2014 in PCT/US2013/061614.
International Search Report and Written Opinion mailed Jun. 15, 2015, from PCT Appln. No. PCT/US15/22626 (the corresponding PCT application to the present application).

* cited by examiner

GEL COMPRISING A PHASE-CHANGE MATERIAL, METHOD OF PREPARING THE GEL, THERMAL EXCHANGE IMPLEMENT COMPRISING THE GEL, AND METHOD OF PREPARING THE THERMAL EXCHANGE IMPLEMENT

CROSS-REFERENCE TO RELATED APPLICATIONS

The present application is a continuation-in-part of U.S. patent application Ser. No. 14/036,497, inventors Richard M. Formato et al., filed Sep. 25, 2013, which, in turn, claims the benefit under 35 U.S.C. 119(e) of U.S. Provisional Patent Application No. 61/705,293, filed Sep. 25, 2012, the disclosures of which are incorporated herein by reference.

BACKGROUND OF THE INVENTION

The present invention relates generally to phase-change materials and relates more particularly to a novel gel comprising a phase-change material, to a method of preparing the gel, to a thermal exchange implement comprising the gel, and to a method of preparing the thermal exchange implement.

It is often desirable to store and/or to transport temperature-sensitive materials, examples of such temperature-sensitive materials including, but not being limited to, pharmaceuticals, biological samples, foods, and beverages. Packaging systems for storing and/or transporting such materials typically include some means for maintaining the temperature-sensitive materials within a desired temperature range. In many instances, the means for maintaining the temperature-sensitive material within a desired temperature range includes positioning a phase-change material within the storage system in proximity to the temperature-sensitive material. Typically, the phase-change material is selected such that it has a phase change temperature that is within the desired temperature range for the temperature-sensitive material in question. A common phase-change material is water, which is typically thickened or incorporated into some form of a gel for the above-described type of application. Other common phase-change materials include organic compounds, such as n-alkanes (e.g., n-tetradecane, n-hexadecane, and n-octadecane), fatty acid esters (e.g., methyl esters, such as lauric acid methyl ester (also known as methyl laurate) and myristic acid methyl ester (also known as methyl myristate)), fatty alcohols (e.g., decyl alcohol (also known as 1-decanol) and dodecyl alcohol (also known as 1-dodecanol)), and fatty acids (e.g., ricinoleic acid and caprylic acid).

Because phase-change materials are designed to be changeable to or from a liquid state, such phase-change materials are typically encased within some form of closed container. An example of one common type of closed container is a flexible pouch, and an example of another common type of closed container is a rigid bottle.

One problem that has been encountered, particularly with organic phase-change materials like n-tetradecane is that, because such phase-change materials have very low surface tension, if there is a defect, such as a hole, in the container holding the phase-change material, the phase-change material tends to pass very easily through the defect and subsequently flows near or onto the temperature-sensitive material. As can readily be appreciated, the passage of the phase-change material through such a defect is undesirable. Moreover, in those instances where the container or portions thereof are permeable to the phase-change material (such as where the phase-change material is n-tetradecane and the container for the phase-change material is a polyethylene bottle or a pouch having polyethylene seals), the phase-change material has a tendency, over time, to permeate through the container. Consequently, the phase-change material may "leak" from the container even in the absence of a defect in the container.

Documents of interest may include the following, all of which are incorporated herein by reference: U.S. Pat. No. 7,964,664 B2, inventor Pearce, issued Jun. 21, 2011; U.S. Pat. No. 7,919,163 B2, inventor Romero, issued Apr. 5, 2011; U.S. Pat. No. 7,714,081 B2, inventors Sera et al., issued May 11, 2010; U.S. Pat. No. 7,625,967 B2, inventor St. Clair, issued Dec. 1, 2009; U.S. Pat. No. 7,320,770 B2, inventors Chomard et al., issued Jan. 22, 2008; U.S. Pat. No. 7,294,374 B2, inventor Romero, issued Nov. 13, 2007; U.S. Pat. No. 7,105,104 B2, inventors Chomard et al., issued Sep. 12, 2006; U.S. Pat. No. 6,574,971 B2, inventor Suppes, issued Jun. 10, 2003; U.S. Pat. No. 6,340,467 B1, inventor Morrison, issued Jan. 22, 2002; U.S. Pat. No. 5,994,450; inventor Pearce, issued Nov. 30, 1999; U.S. Pat. No. 5,718,835, inventors Momose et al., issued Feb. 17, 1998; U.S. Pat. No. 5,508,334, inventor Chen, issued Apr. 16, 1996; U.S. Pat. No. 5,390,791, inventor Yeager, issued Feb. 21, 1995; U.S. Pat. No. 4,797,160, inventor Salyer, issued Jan. 10, 1989; U.S. Pat. No. RE 34,880, inventor Salyer, issued Mar. 21, 1995; U.S. Patent Application Publication No. US 2011/0281485 A1, inventors Rolland et al., published Nov. 17, 2011; U.S. Patent Application Publication No. US 2011/0248208 A1, inventors Rolland et al., published Oct. 13, 2011; PCT International Publication No. WO 2007/040395 A1, published Apr. 12, 2007; PCT International Publication No. WO 03/057795 A1, published Jul. 17, 2003; European Patent Application Publication No. EP 2,261,297 A2, published Dec. 15, 2010; and European Patent Application Publication No. EP 1,838,802 A2, published Oct. 3, 2007.

SUMMARY OF THE INVENTION

It is an object of the present invention to provide a novel gel comprising a phase-change material.

According to one aspect of the invention, a novel gel is provided, the gel comprising a phase-change material and a gelling agent, the gel being formed by (a) mixing the phase-change material and the gelling agent at an intermediate temperature that is above room temperature but is below the flash point of the phase-change material and at which the gelling agent partially, but not completely, dissolves in the phase-change material, whereby a non-homogeneous mixture is produced, and (b) then, cooling the non-homogeneous mixture to room temperature.

For purposes of the present specification and claims, the expression "room temperature" may refer more broadly to a temperature in the range of about 15° C. to about 30° C. or may refer more specifically to a temperature in the range of about 19° C. to about 25° C.

For purposes of the present specification and claims, the expression "the flash point of the phase-change material" is defined to mean the lowest temperature at which the phase-change material, while in a liquid state, can vaporize to form an ignitable mixture in air.

According to a detailed feature of the invention, the phase-change material may be at least one organic phase-change material.

According to another detailed feature of the invention, the at least one organic phase-change material may be at least one compound selected from the group consisting of n-alkanes, fatty acid esters, fatty alcohols, and fatty acids.

According to another detailed feature of the invention, the at least one organic phase-change material may be one or more compounds selected from the group consisting of n-tetradecane, n-hexadecane, n-octadecane, and mixtures thereof.

According to another detailed feature of the invention, the gelling agent may be at least one saturated olefin rubber.

According to another detailed feature of the invention, the gelling agent may be at least one hydrogenated styrenic block copolymer.

According to another detailed feature of the invention, the gelling agent may be at least one styrene-ethylene-butylene-styrene (SEBS) tri-block copolymer.

According to another detailed feature of the invention, the gelling agent may be at least one high molecular weight styrene-ethylene-butylene-styrene tri-block copolymer with a styrene:rubber ratio in the range of about 30:70 to 33:67% by weight.

According to another detailed feature of the invention, the phase-change material may be n-tetradecane, and the gelling agent may be a high molecular weight styrene-ethylene-butylene-styrene tri-block copolymer with a styrene:rubber ratio in the range of about 30:70 to 33:67% by weight.

According to another detailed feature of the invention, the gelling agent may constitute up to about 10%, by weight, of the gel, preferably less than 6%, by weight, of the gel, with the phase-change material constituting the remainder of the gel.

According to another detailed feature of the invention, the temperature at which the phase-change material and the gelling agent are mixed together may be in the range of about 40° C. to about 55° C.

According to another detailed feature of the invention, the gelling agent may be at least one styrene-ethylene-propylene-styrene (SEPS) tri-block copolymer.

According to another detailed feature of the invention, the gelling agent may be at least one high molecular weight styrene-ethylene-propylene-styrene tri-block copolymer with a styrene:rubber ratio in the range of about 20:80% by weight.

For purposes of the present specification and claims, the term "high molecular weight," when used to characterize SEBS and/or SEPS copolymers, may be inferred by a Brookfield viscosity of at least 400 centipoise for a 10% by weight solution of [neat] polymer in toluene measured at 25° C. to 30° C.

According to another aspect of the invention, a novel gel is provided, the gel comprising a phase-change material and a gelling agent, the gel being formed by (a) mixing the phase-change material and the gelling agent at a first temperature at which the phase-change material is in a liquid state and which is below the flash point of the phase-change material and at which the mixture is not a viscoelastic liquid, whereby a non-homogenous mixture is produced; (b) then, heating the non-homogeneous mixture to a second temperature that is below the flash point of the phase-change material and at which a viscoelastic liquid is formed; and (c) then, cooling the viscoelastic liquid to room temperature.

According to a detailed feature of the invention, the phase-change material may be at least one organic phase-change material.

According to another detailed feature of the invention, the at least one organic phase-change material may be at least one compound selected from the group consisting of n-alkanes, fatty acid esters, fatty alcohols, and fatty acids.

According to another detailed feature of the invention, the at least one organic phase-change material may be one or more compounds selected from the group consisting of n-tetradecane, n-hexadecane, n-octadecane, and mixtures thereof.

According to another detailed feature of the invention, the gelling agent may be at least one saturated olefin rubber.

According to another detailed feature of the invention, the gelling agent may be at least one hydrogenated styrenic block copolymer.

According to another detailed feature of the invention, the gelling agent may be at least one styrene-ethylene-butylene-styrene (SEBS) tri-block copolymer.

According to another detailed feature of the invention, the gelling agent may be at least one high molecular weight styrene-ethylene-butylene-styrene tri-block copolymer with a styrene:rubber ratio in the range of about 30:70 to 33:67% by weight.

According to another detailed feature of the invention, the phase-change material may be n-hexadecane, and the gelling agent may be a high molecular weight styrene-ethylene-butylene-styrene tri-block copolymer with a styrene:rubber ratio in the range of about 30:70 to 33:67% by weight.

According to another detailed feature of the invention, the phase-change material may be a mixture of n-tetradecane and n-hexadecane, and the gelling agent may be a high molecular weight styrene-ethylene-butylene-styrene tri-block copolymer with a styrene:rubber ratio in the range of about 30:70 to 33:67% by weight.

According to another detailed feature of the invention, the gelling agent may constitute up to about 10%, by weight, of the gel, preferably less than 6%, by weight, of the gel, with the phase-change material constituting the remainder of the gel.

According to another detailed feature of the invention, the gelling agent may be at least one styrene-ethylene-propylene-styrene (SEPS) tri-block copolymer.

According to another detailed feature of the invention, the gelling agent may be at least one high molecular weight styrene-ethylene-propylene-styrene tri-block copolymer with a styrene:rubber ratio in the range of about 20:80% by weight.

According to another detailed feature of the invention, where the phase-change material is a liquid at room temperature, the above-described step of mixing the phase-change material and the gelling agent at a first temperature may take place at room temperature, i.e., at a temperature in the range of about 15° C. to about 30° C. or, more specifically, at a temperature in the range of about 19° C. to about 25° C.

According to another detailed feature of the invention, after the mixing step and before the heating step, the non-homogeneous mixture may be allowed to rest for a period of time, during which time the gelling agent may swell.

According to another detailed feature of the invention, the resting period may be in the range of about 30 minutes to about 72 hours and preferably may be in the range of about 16 hours to 20 hours.

According to another detailed feature of the invention, after the phase-change material and the gelling agent have been mixed to form a non-homogeneous mixture, the non-homogeneous mixture may be placed in a thermal exchange implement container, and the heating, cooling and optional resting steps may thereafter be performed on the non-homogeneous mixture while within the thermal exchange implement container.

According to another detailed feature of the invention, the temperature at which the viscoelastic liquid is formed may be between about 40° C. and about 80° C., preferably between about 45° C. and about 65° C.

According to another detailed feature of the invention, the step of heating the non-homogeneous mixture from the first temperature to the second temperature may comprise a ramp phase in which the temperature is gradually raised from the first temperature to the second temperature and a constant (or soak) phase in which the temperature is maintained at the second temperature.

According to another detailed feature of the invention, the ramp phase may range from a minimum ramp rate of about 0.025° C./minute to a maximum ramp rate of about 2.5° C./minute, with a preferred ramp rate being in the range of about 0.15° C./minute to about 0.30° C./minute.

According to another detailed feature of the invention, the constant (or soak) phase may range from a minimum of about 0.5 hours to a maximum of about 20 hours, with a preferred range of about 6 hours to about 16 hours.

According to another detailed feature of the invention, the step of cooling the viscoelastic liquid to room temperature may take place simply by allowing the viscoelastic liquid to cool at room temperature or may take place using cooling materials and/or equipment.

According to another detailed feature of the invention, the cooling step may be performed with cooling equipment and may involve a ramping down of temperature at a rate complementary to that described above for the ramp phase of the heating step. In other words, the ramping down of temperature during the cooling step may range from a minimum ramp down rate of about 0.025° C./minute to a maximum ramp down rate of about 2.5° C./minute, with a preferred ramp down rate being in the range of about 0.15° C./minute to about 0.30° C./minute.

It is another object of the present invention to provide a novel method of preparing a gel comprising a phase-change material.

According to one aspect of the invention, a novel method of preparing a gel is provided, the method comprising the steps of (a) providing a phase-change material; (b) providing a gelling agent; (c) mixing the phase-change material and the gelling agent at an intermediate temperature that is above room temperature but is below the flash point of the phase-change material and at which the gelling agent partially, but not completely, dissolves in the phase-change material, whereby a non-homogeneous mixture is produced; and (d) then, cooling the non-homogeneous mixture to room temperature.

According to a detailed feature of the invention, the phase-change material may be at least one organic phase-change material.

According to another detailed feature of the invention, the at least one organic phase-change material may be at least one compound selected from the group consisting of n-alkanes, fatty acid esters, fatty alcohols, and fatty acids.

According to another detailed feature of the invention, the at least one organic phase-change material may be one or more compounds selected from the group consisting of n-tetradecane, n-hexadecane, n-octadecane, and mixtures thereof.

According to another detailed feature of the invention, the gelling agent may be at least one saturated olefin rubber.

According to another detailed feature of the invention, the gelling agent may be at least one hydrogenated styrenic block copolymer.

According to another detailed feature of the invention, the gelling agent may be at least one styrene-ethylene-butylene-styrene tri-block copolymer.

According to another detailed feature of the invention, the gelling agent may be at least one high molecular weight styrene-ethylene-butylene-styrene tri-block copolymer with a styrene:rubber ratio in the range of about 30:70 to 33:67% by weight.

According to another detailed feature of the invention, the phase-change material may be n-tetradecane, and the gelling agent may be a high molecular weight styrene-ethylene-butylene-styrene tri-block copolymer with a styrene:rubber ratio in the range of about 30:70 to 33:67% by weight.

According to another detailed feature of the invention, the gelling agent may constitute up to about 10%, by weight, of the gel, preferably less than 6%, by weight, of the gel, with the phase-change material constituting the remainder of the gel.

According to another detailed feature of the invention, the temperature at which the phase-change material and the gelling agent are mixed together may be in the range of about 40° C. to about 55° C.

According to another detailed feature of the invention, the gelling agent may be at least one styrene-ethylene-propylene-styrene tri-block copolymer.

According to another detailed feature of the invention, the gelling agent may be at least one high molecular weight styrene-ethylene-propylene-styrene tri-block copolymer with a styrene:rubber ratio in the range of about 20:80% by weight.

According to another aspect of the invention, a novel method of preparing a gel is provided, the method comprising the steps of (a) providing a phase-change material; (b) providing a gelling agent; (c) mixing the phase-change material and the gelling agent at a first temperature at which the phase-change material is in a liquid state and which is below the flash point of the phase-change material and at which the mixture is not a viscoelastic liquid, whereby a non-homogenous mixture is produced; (d) then, heating the non-homogeneous mixture to a second temperature that is below the flash point of the phase-change material and at which a viscoelastic liquid is formed; and (e) then, cooling the viscoelastic liquid to room temperature.

According to a detailed feature of the invention, the phase-change material may be at least one organic phase-change material.

According to another detailed feature of the invention, the at least one organic phase-change material may be at least one compound selected from the group consisting of n-alkanes, fatty acid esters, fatty alcohols, and fatty acids.

According to another detailed feature of the invention, the at least one organic phase-change material may be one or more compounds selected from the group consisting of n-tetradecane, n-hexadecane, n-octadecane, and mixtures thereof.

According to another detailed feature of the invention, the gelling agent may be at least one saturated olefin rubber.

According to another detailed feature of the invention, the gelling agent may be at least one hydrogenated styrenic block copolymer.

According to another detailed feature of the invention, the gelling agent may be at least one styrene-ethylene-butylene-styrene tri-block copolymer.

According to another detailed feature of the invention, the gelling agent may be at least one high molecular weight styrene-ethylene-butylene-styrene tri-block copolymer with a styrene:rubber ratio in the range of about 30:70 to 33:67% by weight.

According to another detailed feature of the invention, the phase-change material may be n-hexadecane, and the gelling agent may be a high molecular weight styrene-ethylene-butylene-styrene tri-block copolymer with a styrene:rubber ratio in the range of about 30:70 to 33:67% by weight.

According to another detailed feature of the invention, the phase-change material may be a mixture of n-tetradecane and n-hexadecane, and the gelling agent may be a high molecular weight styrene-ethylene-butylene-styrene tri-block copolymer with a styrene:rubber ratio in the range of about 30:70 to 33:67% by weight.

According to another detailed feature of the invention, the gelling agent may constitute up to about 10%, by weight, of the gel, preferably less than 6%, by weight, of the gel, with the phase-change material constituting the remainder of the gel.

According to another detailed feature of the invention, the gelling agent may be at least one styrene-ethylene-propylene-styrene tri-block copolymer.

According to another detailed feature of the invention, the gelling agent may be at least one high molecular weight styrene-ethylene-propylene-styrene tri-block copolymer with a styrene:rubber ratio in the range of about 20:80% by weight.

According to another detailed feature of the invention, where the phase-change material is a liquid at room temperature, the above-described step of mixing the phase-change material and the gelling agent at a first temperature may take place at room temperature, i.e., at a temperature in the range of about 15° C. to about 30° C. or, more specifically, at a temperature in the range of about 19° C. to about 25° C.

According to another detailed feature of the invention, after the mixing step and before the heating step, the non-homogeneous mixture may be allowed to rest for a period of time, during which time the gelling agent may swell.

According to another detailed feature of the invention, the resting period may be in the range of about 30 minutes to about 72 hours and preferably may be in the range of about 16 hours to 20 hours.

According to another detailed feature of the invention, after the phase-change material and the gelling agent have been mixed to form a non-homogeneous mixture, the non-homogeneous mixture may be placed in a thermal exchange implement container, and the heating, cooling and optional resting steps may thereafter be performed on the non-homogeneous mixture while within the thermal exchange implement container.

According to another detailed feature of the invention, the temperature at which the viscoelastic liquid is formed may be between about 40° C. and about 80° C., preferably between about 45° C. and about 65° C., and the heating step may comprise heating to a temperature between about 40° C. and about 80° C., preferably between about 45° C. and about 65° C.

According to another detailed feature of the invention, the step of heating the non-homogeneous mixture from the first temperature to the second temperature may comprise a ramp phase in which the temperature is gradually raised from the first temperature to the second temperature and a constant (or soak) phase in which the temperature is maintained at the second temperature.

According to another detailed feature of the invention, the ramp phase may range from a minimum ramp rate of about 0.025° C./minute to a maximum ramp rate of about 2.5° C./minute, with a preferred ramp rate being in the range of about 0.15° C./minute to about 0.30° C./minute.

According to another detailed feature of the invention, the constant (or soak) phase may range from a minimum of about 0.5 hours to a maximum of about 20 hours, with a preferred range of about 6 hours to about 16 hours.

According to another detailed feature of the invention, the step of cooling the viscoelastic liquid to room temperature may take place simply by allowing the viscoelastic liquid to cool at room temperature or may take place using cooling materials and/or equipment.

According to another detailed feature of the invention, the cooling step may be performed with cooling equipment and may involve a ramping down of temperature at a rate complementary to that described above for the ramp phase of the heating step. In other words, the ramping down of temperature during the cooling step may range from a minimum ramp down rate of about 0.025° C./minute to a maximum ramp down rate of about 2.5° C./minute, with a preferred ramp down rate being in the range of about 0.15° C./minute to about 0.30° C./minute.

It is still another object to provide a novel thermal exchange implement.

According to one aspect of the invention, a novel thermal exchange implement is provided, the thermal exchange implement comprising a gel of any of the types described above and a container holding a quantity of the gel.

According to a detailed feature of the invention, the container may be a flexible pouch.

According to another detailed feature of the invention, the container may be a rigid bottle.

It is a further object to provide a novel method for preparing a thermal exchange implement.

According to one aspect of the invention, a novel method of preparing a thermal exchange implement is provided, the method comprising the steps of (a) providing a phase-change material; (b) providing a gelling agent; (c) mixing together the phase-change material and the gelling agent at an intermediate temperature that is above room temperature but is below the flash point of the phase-change material and at which the gelling agent partially, but not completely, dissolves in the phase-change material, whereby a non-homogeneous mixture is produced; (d) then, cooling the non-homogeneous mixture to room temperature, whereby a gel is formed; and (e) depositing the gel in a thermal exchange implement container.

According to a detailed feature of the invention, the phase-change material may be at least one organic phase-change material.

According to another detailed feature of the invention, the at least one organic phase-change material may be at least one compound selected from the group consisting of n-alkanes, fatty acid esters, fatty alcohols, and fatty acids.

According to another detailed feature of the invention, the at least one organic phase-change material may be one or more compounds selected from the group consisting of n-tetradecane, n-hexadecane, n-octadecane, and mixtures thereof.

According to another detailed feature of the invention, the gelling agent may be at least one saturated olefin rubber.

According to another detailed feature of the invention, the gelling agent may be at least one hydrogenated styrenic block copolymer.

According to another detailed feature of the invention, the gelling agent may be at least one styrene-ethylene-butylene-styrene tri-block copolymer.

According to another detailed feature of the invention, the gelling agent may be at least one high molecular weight styrene-ethylene-butylene-styrene tri-block copolymer with a styrene:rubber ratio in the range of about 30:70 to 33:67% by weight.

According to another detailed feature of the invention, the phase-change material may be n-tetradecane, and the gelling agent may be a high molecular weight styrene-ethylene-butylene-styrene tri-block copolymer with a styrene:rubber ratio in the range of about 30:70 to 33:67% by weight.

According to another detailed feature of the invention, the gelling agent may constitute up to about 10%, by weight, of the gel, preferably less than 6%, by weight, of the gel, with the phase-change material constituting the remainder of the gel.

According to another detailed feature of the invention, the temperature at which the phase-change material and the gelling agent are mixed together may be in the range of about 40° C. to about 55° C.

According to another detailed feature of the invention, the gelling agent may be at least one styrene-ethylene-propylene-styrene tri-block copolymer.

According to another detailed feature of the invention, the gelling agent may be at least one high molecular weight styrene-ethylene-propylene-styrene tri-block copolymer with a styrene:rubber ratio in the range of about 20:80% by weight.

According to another detailed feature of the invention, the thermal exchange implement container may be a flexible pouch.

According to another detailed feature of the invention, the thermal exchange implement container may be a rigid bottle.

According to another aspect of the invention, a novel method of preparing a thermal exchange implement is provided, the method comprising the steps of (a) providing a phase-change material; (b) providing a gelling agent; (c) mixing the phase-change material and the gelling agent at a first temperature at which the phase-change material is in a liquid state and which is below the flash point of the phase-change material and at which the mixture is not a viscoelastic liquid, whereby a non-homogeneous mixture is produced; (d) then, depositing the non-homogeneous mixture in a thermal exchange implement container; (e) then, while the non-homogeneous mixture is in the thermal exchange implement container, heating the non-homogeneous mixture to a second temperature that is below the flash point of the phase-change material and at which the non-homogeneous mixture forms a viscoelastic liquid; and (f) then, while the viscoelastic liquid is in the thermal exchange implement container, cooling the viscoelastic liquid to room temperature.

According to a detailed feature of the invention, the phase-change material may be at least one organic phase-change material.

According to another detailed feature of the invention, the at least one organic phase-change material may be at least one compound selected from the group consisting of n-alkanes, fatty acid esters, fatty alcohols, and fatty acids.

According to another detailed feature of the invention, the at least one organic phase-change material may be one or more compounds selected from the group consisting of n-tetradecane, n-hexadecane, n-octadecane, and mixtures thereof.

According to another detailed feature of the invention, the gelling agent may be at least one saturated olefin rubber.

According to another detailed feature of the invention, the gelling agent may be at least one hydrogenated styrenic block copolymer.

According to another detailed feature of the invention, the gelling agent may be at least one styrene-ethylene-butylene-styrene tri-block copolymer.

According to another detailed feature of the invention, the gelling agent may be at least one high molecular weight styrene-ethylene-butylene-styrene tri-block copolymer with a styrene:rubber ratio in the range of about 30:70 to 33:67% by weight.

According to another detailed feature of the invention, the phase-change material may be n-hexadecane, and the gelling agent may be a high molecular weight styrene-ethylene-butylene-styrene tri-block copolymer with a styrene:rubber ratio in the range of about 30:70 to 33:67% by weight.

According to another detailed feature of the invention, the phase-change material may be a mixture of n-tetradecane and n-hexadecane, and the gelling agent may be a high molecular weight styrene-ethylene-butylene-styrene tri-block copolymer with a styrene:rubber ratio in the range of about 30:70 to 33:67% by weight.

According to another detailed feature of the invention, the gelling agent may constitute up to about 10%, by weight, of the gel, preferably less than 6%, by weight, of the gel, with the phase-change material constituting the remainder of the gel.

According to another detailed feature of the invention, the gelling agent may be at least one styrene-ethylene-propylene-styrene tri-block copolymer.

According to another detailed feature of the invention, the gelling agent may be at least one high molecular weight styrene-ethylene-propylene-styrene tri-block copolymer with a styrene:rubber ratio in the range of about 20:80% by weight.

According to another detailed feature of the invention, where the phase-change material is a liquid at room temperature, the above-described step of mixing the phase-change material and the gelling agent may take place at room temperature, i.e., at a temperature in the range of about 15° C. to about 30° C. or, more specifically, at a temperature in the range of about 19° C. to about 25° C.

According to another detailed feature of the invention, after the mixing step and before the heating step, the non-homogeneous mixture may be allowed to rest for a period of time, during which time the gelling agent may swell.

According to another detailed feature of the invention, the resting period may be in the range of about 30 minutes to about 72 hours and preferably may be in the range of about 16 hours to 20 hours.

According to another detailed feature of the invention, after the phase-change material and the gelling agent have been mixed to form a non-homogeneous mixture, the non-homogeneous mixture may be placed in a thermal exchange implement container, and the heating, cooling and optional resting steps may thereafter be performed on the non-homogeneous mixture while within the thermal exchange implement container.

According to another detailed feature of the invention, the temperature at which the viscoelastic liquid is formed may be between about 40° C. and about 80° C., preferably between about 45° C. and about 65° C., and the heating step may comprise heating to a temperature between about 40° C. and about 80° C., preferably between about 45° C. and about 65° C.

According to another detailed feature of the invention, the step of heating the non-homogeneous mixture from the first temperature to the second temperature may comprise a ramp phase in which the temperature is gradually raised from the first temperature to the second temperature and a constant (or soak) phase in which the temperature is maintained at the second temperature.

According to another detailed feature of the invention, the ramp phase may range from a minimum ramp rate of about 0.025° C./minute to a maximum ramp rate of about 2.5° C./minute, with a preferred ramp rate being in the range of about 0.15° C./minute to about 0.30° C./minute.

According to another detailed feature of the invention, the constant (or soak) phase may range from a minimum of about 0.5 hours to a maximum of about 20 hours, with a preferred range of about 6 hours to about 16 hours.

According to another detailed feature of the invention, the step of cooling the viscoelastic liquid to room temperature may take place simply by allowing the viscoelastic liquid to cool at room temperature or may take place using cooling materials and/or equipment.

According to another detailed feature of the invention, the cooling step may be performed with cooling equipment and may involve a ramping down of temperature at a rate complementary to that described above for the ramp phase of the heating step. In other words, the ramping down of temperature during the cooling step may range from a minimum ramp down rate of about 0.025° C./minute to a maximum ramp down rate of about 2.5° C./minute, with a preferred ramp down rate being in the range of about 0.15° C./minute to about 0.30° C./minute.

According to another detailed feature of the invention, the thermal exchange implement container may be a flexible pouch.

According to another detailed feature of the invention, the thermal exchange implement container may be a rigid bottle.

Additional objects, as well as features and advantages, of the present invention will be set forth in part in the description which follows, and in part will be obvious from the description or may be learned by practice of the invention. In the description, reference is made to the accompanying drawings which form a part thereof and in which is shown by way of illustration various embodiments for practicing the invention. The embodiments will be described in sufficient detail to enable those skilled in the art to practice the invention, and it is to be understood that other embodiments may be utilized and that structural changes may be made without departing from the scope of the invention. The following detailed description is, therefore, not to be taken in a limiting sense, and the scope of the present invention is best defined by the appended claims.

BRIEF DESCRIPTION OF THE DRAWINGS

The accompanying drawings, which are hereby incorporated into and constitute a part of this specification, illustrate various embodiments of the invention and, together with the description, serve to explain the principles of the invention. In the drawings wherein like reference numerals represent like parts.

DETAILED DESCRIPTION OF THE INVENTION

Figure 1:
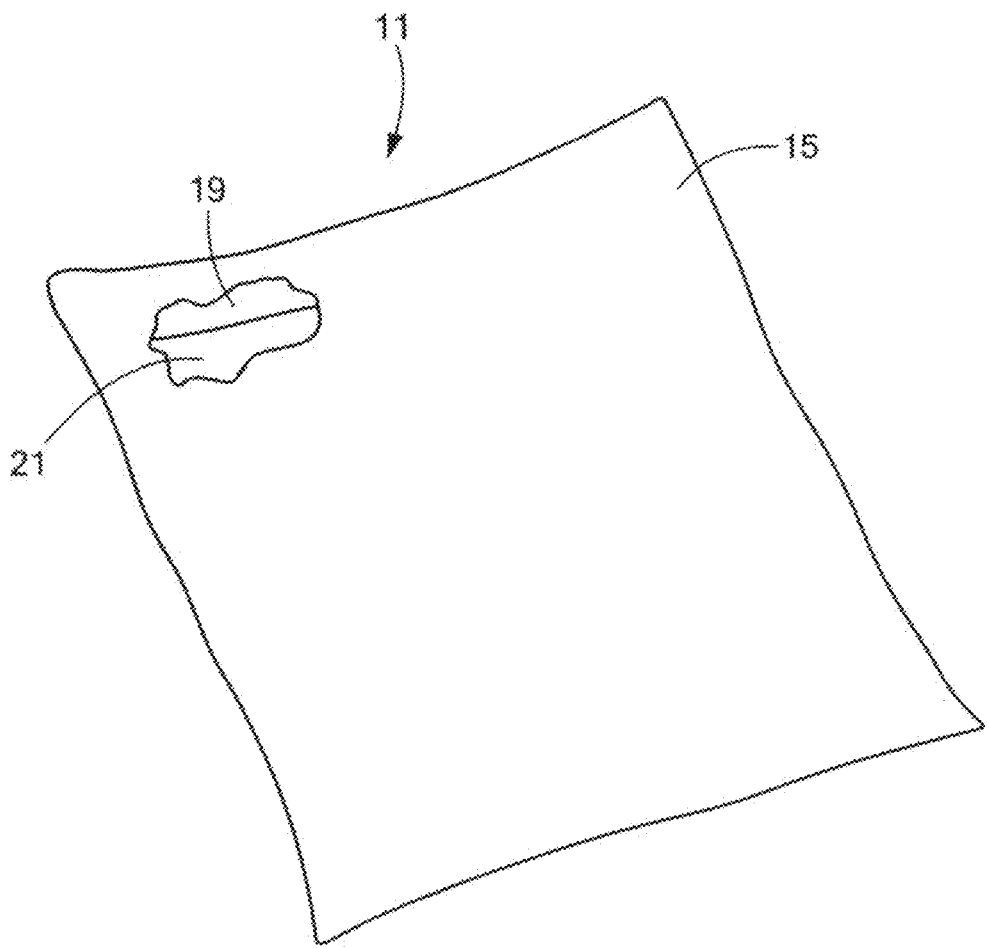
FIG. 1 is a front view, broken away in part, of a first embodiment of a thermal exchange implement for use in maintaining a temperature-sensitive material within a desired temperature range, the thermal exchange implement being constructed according to the teachings of the present invention.

The present invention is directed, in part, at a gel comprising a phase-change material (PCM) and a gelling agent. The present invention is also directed, in part, at a method of preparing the aforementioned gel. The present invention is additionally directed, in part, at a thermal exchange implement comprising the combination of the aforementioned gel and a container holding a quantity of the gel. The present invention is further directed, in part, at a method of preparing the aforementioned thermal exchange implement.

The phase-change material of the present invention may include, but is not limited to, one or more organic phase-change materials. The one or more organic phase-change materials may include, but are not limited to, one or more of the following: n-alkanes, fatty acid esters, fatty alcohols, and fatty acids.

Examples of n-alkanes suitable for use as the phase-change material may include, but are not limited to, n-tetradecane (n-TD), which has a phase change temperature of about 5° C.; n-hexadecane (n-HD), which has a phase change temperature of about 17° C.; and n-octadecane (n-OD), which has a phase change temperature of about 28° C. Examples of n-alkanes suitable for use as the phase-change material may also include mixtures of two or more n-alkanes, such as mixtures of n-tetradecane and n-hexadecane, mixtures of n-hexadecane and n-octadecane, etc. Where, for example, the phase-change material is a mixture of two or more n-alkanes selected from the group consisting of n-tetradecane, n-hexadecane, and n-octadecane, the relative proportions of the two or more n-alkanes of the mixture may be adjusted in order to modify the phase change temperature of the mixture. For example, by selecting appropriate relative proportions of n-tetradecane, n-hexadecane, and/or n-octadecane, one can tailor the phase change temperature of a mixture thereof to a desired phase change temperature lying within a range of about 2° C. to about 28° C. or, more specifically, lying within a range of about 2° C. to about 8° C. or within a range of about 15° C. to about 28° C. For example, a mixture containing about 3.5% by weight n-hexadecane and about 96.5% by weight n-tetradecane has a phase change temperature of about 3° C., and a mixture containing about 38.2% by weight n-tetradecane and about 61.8% by weight n-hexadecane has a phase change temperature of about 7° C.

Examples of fatty acid esters suitable for use as the phase-change material may include, but are not limited to, methyl esters, which may include lauric acid methyl ester (i.e., methyl laurate), myristic acid methyl ester (i.e., methyl myristate), and mixtures thereof. Examples of fatty alcohols suitable for use as the phase-change material may include, but are not limited to, decyl alcohol (i.e., 1-decanol), dodecyl alcohol (i.e., 1-dodecanol), and mixtures thereof. Examples of fatty acids suitable for use as the phase-change material may include, but are not limited to, ricinoleic acid, caprylic acid, and mixtures thereof.

The gelling agent of the present invention may include, but is not limited to, one of the following or combinations of the following: organic gelling agents; organometallic gelling agents, such as, but not limited to, alkaline or alkaline earth soaps; and inorganic gelling agents, such as, but not limited to, fumed silica (hydrophobic and hydrophilic) and bentonite clay with and without a polar activator. Of the aforementioned gelling agents, organic gelling agents are preferred. The aforementioned organic gelling agents may include, for example, polyamide-polyether copolymers and saturated olefin rubbers, with the latter being preferred. Examples of such saturated olefin rubbers may include hydrogenated styrenic block copolymers (HSBC), such as, but not limited to, the copolymers commercially available from Kraton Polymers LLC (Houston, Tex.) as the Kraton G, SEBS/SEP, EP and ERS families of copolymers, as well as the copolymers commercially available from Kuraray America, Inc. (Houston, Tex.) as the SEPTON SEP, SEPS, SEBS and SEEPS families of copolymers.

The aforementioned Kraton G copolymers are thermoplastic elastomers having copolymer chains in a di-block, tri-block, or multi-arm configuration. The tri-block copolymers have styrene (S) on both ends of the chain and a rubber (e.g., ethylene propylene (EP) or ethylene butylene (EB)) in the middle whereas the di-block structure has styrene on only one end of the chain. For tri-block structure based gels, it is known that the rubber segments form separate domains and that the styrene segments lock together to form physical cross links. The key properties to consider, in developing gels using SEBS and SEPS copolymers, include styrene content, molecular weight, tri-block vs. di-block, and end-use temperature. For a given concentration of copolymer, flow resistance is increased by increasing styrene content, increasing molecular weight, using tri-block structures and using lower temperatures.

In addition to including a phase-change material and a gelling agent, the gel of the present invention may additionally include a nominal amount of a dye, which may be used to give the gel a desired and/or distinctive color. In this manner, for example, gels whose respective phase-change materials possess different phase change temperatures may each be dyed a different color.

As will be discussed further below, the gel of the present invention may be prepared by at least two different techniques. According to a first gel-forming technique, the phase-change material and the gelling agent are first mixed at an intermediate temperature that is above room temperature but is below the flash point of the phase-change material and at which the gelling agent partially, but not completely, dissolves in the phase-change material, whereby a non-homogeneous mixture is produced. Thereafter, the non-homogeneous mixture is cooled to room temperature. According to a second gel-forming technique, the phase-change material and the gelling agent are mixed at a temperature at which the phase-change material is in a liquid state and which is below the flash point of the phase-change material and at which the mixture is not a viscoelastic liquid, whereby a non-homogenous mixture is produced. In most instances, if the phase-change material is a liquid at room temperature, the aforementioned mixing step may take place at room temperature. The non-homogeneous mixture is then heated to a temperature that is below the flash point of the phase-change material and at which a viscoelastic liquid is formed. (If desired, after the mixing step and prior to the heating step, the non-homogeneous mixture may be allowed to rest for a period of time, during which time the gelling agent may swell.) The viscoelastic liquid is then cooled to room temperature to form the gel.

In the case of both the first technique and the second technique, the cooling step may involve simply allowing the non-homogeneous mixture to cool or may involve the use of cooling materials and/or equipment.

In accordance with the present invention, a gel comprising a phase-change material and a gelling agent preferably possesses one or more of the following properties:

Amount of Gelling Agent: The gelling agent is preferably commercially available in a form that allows ease of use in manufacturing. The amount of gelling agent used should be similar to (or below) typical refrigerant weight tolerances (e.g. up to about 10% by weight of the gel, preferably less than 6% by weight of the gel). Furthermore, minimizing the amount of gelling agent used is important in maximizing the latent heat (energy absorbed or released during phase change) of the resulting gel.

Gel Freeze/Thaw cycling: The gel preferably passes multiple freeze/thaw test cycles (n=10 cycles, for example +40° C. for 6 hrs, −20° C. for 6 hrs) such that no liquid PCM separation (syneresis) is seen during the test or after it is complete. This is important since, as typically used, refrigerants can go through several freeze/thaw cycles before being used and/or may be used multiple times.

Gel Performance: The gelling agent should not react with the phase-change material. In addition, the gel should have performance equal to or exceeding conventional polyacrylic acid (PAA)/water-based gels in terms of leakage. It is highly desirable that the gel have a performance equal to or exceeding conventional carboxymethyl-cellulose (CMC)/water-based gels in terms of leakage. Ideally, the gel should not expel any liquid PCM (no syneresis) when exposed to a 1.5 psi loading for long time periods, such as 24 hours or more.

Gel Processing (mixing at room temperature): Preparation at typical plant operating temperatures (15° C. to 30° C.) is highly preferred. If typical plant operating temperature preparation is used to mix the PCM and the gelling agent, and the resulting non-homogeneous mixture is placed into its container at room temperature, additional heating will be needed to form a viscoelastic liquid, which will gel upon cooling back to room temperature. Furthermore, the room temperature non-homogeneous mixture should be able to be incorporated into its container (gel pack, saddlebag, bottle, mat, etc.) using conventional vertical form fill and seal (VFFS) equipment and/or bottle filling machinery (i.e., room temperature non-homogeneous mixture must be pump-able). An example of a vertical form fill and seal machine is Model W-18 vertical-form-fill-seal pouch/sachet packaging machine, which is commercially available from Winpak Lane, Inc. (San Bernadino, Calif.).

Gel Processing (mixing at above room temperature): Heating (up to flash point of PCM, which for n-tetradecane is 99° C.) while mixing may be acceptable. The gel, once made, should be able to be incorporated into its container (gel pack, saddlebag, bottle, mat, etc.) using standard VFFS equipment and/or bottle filling machinery (i.e., gel must be pump-able).

Gel Operating Temperature: The gel should meet its performance requirements at typical exposure temperatures from −20° C. to +40° C. Specifically, the gel should pass the "upside down" test (inverted in container without any flow) over this temperature range.

Gel Freeze Point Depression: Freeze point depression must be minimized. For a 5° C. phase-change material, for example, the gel freeze point should not go below 3° C.

Gel Shear Thinning: When the gel is shaken vigorously, shear thinning is okay, but preferably the viscosity recovers quickly (<5 minutes).

As noted above, the present invention contemplates at least two different techniques by which the gel may be formed using a combination of the phase-change material and the gelling agent. The first gel-forming technique involves mixing the phase-change material and the gelling agent at an intermediate temperature that is above room temperature but is below the flash point of the phase-change material and at which the gelling agent partially, but not completely, dissolves in the phase-change material, whereby a non-homogeneous mixture is produced, and then cooling the non-homogeneous mixture to room temperature. Such cooling may take place simply by allowing the non-homogenous mixture to cool at room temperature or may take place using cooling materials and/or equipment. It is believed that, using the first gel-forming technique, one can obtain a gel possessing one or more, and preferably all, of the above properties for a given phase-change material by selecting an appropriate gelling agent, such as an SEBS or SEPS triblock copolymer having a particular styrene/rubber ratio or molecular weight, and/or by adjusting mixing conditions (e.g., temperature or mixing speed) and/or by adjusting the relative proportions of phase-change material and gelling agent.

The second gel-forming technique involves mixing the phase-change material and the gelling agent at a first temperature at which the phase-change material is in a liquid state and which is below the flash point of the phase-change material and at which the mixture is not a viscoelastic liquid, whereby a non-homogenous mixture is produced, then heating the non-homogeneous mixture to a second temperature that is below the flash point of the phase-change material and at which a viscoelastic liquid is formed, and then cooling the viscoelastic liquid to room temperature to form the gel. The temperature at which the viscoelastic liquid may be formed may be between about 40° C. and about 80° C., preferably between about 45° C. and about 65° C., and the heating step may comprise heating to a temperature between about 40° C. and about 80° C., preferably between about 45° C. and about 65° C. The step of heating the non-homogeneous mixture may include a ramp phase during which the temperature is raised from the first temperature to the second temperature and a constant (or soak) phase during which the temperature is maintained at the second temperature. The aforementioned ramp phase may range from a minimum ramp rate of about 0.025° C./minute to a maximum ramp rate of about 2.5° C./minute, with a preferred ramp rate being in the range of about 0.15° C./minute to about 0.30° C./minute. The aforementioned constant (or soak) phase may range from a minimum of about 0.5 hours to a maximum of about 20 hours, with a preferred range of about 6 hours to about 16 hours. The step of cooling the viscoelastic liquid to room temperature may take place simply by allowing the viscoelastic liquid to cool at room temperature or may take place using cooling materials and/or equipment. Preferably, the cooling step is performed with cooling equipment and involves a ramping down of temperature at a rate complementary to that described above for the ramp phase of the heating step. In other words, the ramping down of temperature during the cooling step may range from a minimum ramp down rate of about 0.025° C./minute to a maximum ramp down rate of about 2.5° C./minute, with a preferred ramp down rate being in the range of about 0.15° C./minute to about 0.30° C./minute.

After the mixing step and prior to the heating step of the second gel-forming technique, the non-homogenous mixture may rest for a period of time, during which the gelling agent may swell. This resting period may be, for example, in the range of about 30 minutes to about 72 hours, preferably about 16 hours to about 20 hours.

It is believed that, using the second gel-forming technique, a gel possessing most, if not all, of the above properties can be obtained.

One advantage of the second gel-forming technique, as compared to the first gel-forming technique, is that the second gel-forming technique obviates the need for equipment that is capable of both mixing the phase-change material and the gelling agent and heating the non-homogenous mixture formed thereby. Another advantage of the second gel-forming technique, as compared to the first gel-forming technique, is that the first gel-forming technique results in the production of a gel in the mixing equipment, which may make further processing and/or packaging of the gel more difficult.

A gel possessing many or all of the above properties may comprise one or more n-alkanes, such as, but not limited to, n-tetradecane, n-hexadecane, n-octadecane, or mixtures thereof, as the phase-change material and may comprise an SEBS copolymer, such as, but not limited to, Kraton™ G1651 copolymer (a high molecular weight SEBS tri-block copolymer with a styrene:rubber ratio of 30:70% by weight), Kraton™ G1654 copolymer (a high molecular weight SEBS tri-block copolymer with a styrene:rubber ratio of 33:67% by weight), or Kraton™ G1660 copolymer (an SEBS tri-block copolymer with a styrene:rubber ratio of 31:69% by weight), or an SEPS copolymer, such as, but not limited to, SEPTON™ S2005 copolymer (a high molecular weight SEPS tri-block copolymer with a styrene:rubber ratio of 20:80% by weight), as the gelling agent. In particular, where n-tetradecane is the phase-change material, and where an SEBS tri-block copolymer like Kraton™ G1651 copolymer, Kraton™ G1654 copolymer, or Kraton™ G1660 copolymer or an SEPS tri-block copolymer like SEPTON™ S2005 copolymer is used as the gelling agent, the gelling agent preferably constitutes up to about 10%, by weight, of the gel, more preferably less than 6%, by weight, of the gel, with the balance of the gel being n-tetradecane (and optionally a nominal amount of dye).

Moreover, in accordance with the first gel-forming technique discussed above, such a gel may be prepared by mixing together the phase-change material and the gelling agent at an "intermediate temperature" that is below the flash point of the phase-change material and that is elevated relative to room temperature but that is not so elevated that the gelling agent completely dissolves in the phase-change material. In other words, the gelling agent preferably only partially dissolves in the phase-change material, whereby a homogeneous solution does not form. For the Kraton™ G1651 copolymer, the intermediate temperature has been determined to be in the 55° C. range, for the Kraton™ G1654 copolymer, the intermediate temperature has been determined to be in the 40° C. range, for the Kraton™ G1660 copolymer, the intermediate temperature has been determined to be in the 42° C. range, and for the SEPTON™ S2005 copolymer, the intermediate temperature has been determined to be in the 40° C. range. Such a mixture is then allowed to cool to room temperature.

Alternatively, in accordance with the second gel-forming technique discussed above, such a gel may be prepared by mixing together the phase-change material and the gelling agent at a temperature at which the phase change material is a liquid such that a homogeneous mixture does not form. If desired, the mixture may be allowed to sit to further swell the gelling agent. The non-homogeneous mixture may then be slowly heated to a temperature which is below the flash point of the phase-change material such that a clear viscoelastic liquid is formed. The viscoelastic liquid may then be cooled to room temperature to form the gel. As examples of the types of processing conditions that may be encountered for this technique to form the viscoelastic liquid and then the gel, the non-homogeneous mixture may be heated from its initial temperature of 22° C.+/−3° C. to an elevated temperature of 60° C. over the course of three hours, followed by a soak at 60° C. for 16 hours, followed by a cooling back down to 22° C.+/−3° C. over the course of three hours. If the non-homogeneous mixture is converted to a gelled PCM while in a container that is suitable for use as a thermal exchange implement container, a thermal exchange implement is the result. For phase-change materials with higher phase change temperatures (i.e. +17° C., +28° C.), a thermal exchange implement may be created by heating the non-homogeneous mixture, already in its container, from room temperature to 65° C. over the course of 3.5 hours, followed by a soak at 65° C. for 16 hours, and followed by a cooling back down to room temperature over the course of 3.5 hours. Alternatively, a thermal exchange implement can be made by forming the gel as described above in an open or closed mold in any desired shape and then by loading/packaging the gel into a suitable thermal exchange implement container, which loading/packaging can be accomplished by using conventional horizontal form fill and seal (HFFS) machinery, an example of which is a Model Delta 3000 LD Horizontal Flow Wrapper machine, which is commercially available from Ilapak, Inc. (Newtown, Pa.).

Without wishing to be limited to any particular theory behind the invention, it is believed that the SEBS or SEPS material partially dissolves and partially swells in the phase change material, such as n-tetradecane, n-hexadecane, or mixtures thereof. The dissolution is likely based on the rubber (EB or EP) portion of the copolymer, and the swelling is likely based on the styrene (S) portion of the copolymer. If the temperature is increased too much (e.g. 90° C. or more, which approaches the $T_g$ of polystyrene), a completely clear, homogenous solution results, consisting of both S and EB or S and EP micro-domains, which is highly undesirable. It is, therefore, very important that a homogenous solution not form. Without being bound by theory, it is hypothesized that the styrene (S) portion of the copolymer, when swollen, can still cross-link to allow some gel structural integrity. The rubber (EB or EP) micro-domains ($T_g$ below −50° C.) give the gel its low temperature flexibility. At some (minimum) critical concentration (higher than the 90° C. dissolution concentration), the (SEBS or SEPS)/(n-tetradecane, n-hexadecane or mixtures thereof) forms a cohesive gel with elastic properties.

Mixing may be achieved using an overhead stirrer with a "cowles" type disperser/mixer blade (tip speeds of 0.1 to 20 m/sec, preferably 2 to 6 m/sec for the first gel-forming technique described above and 0.5 to 4.5 m/sec for the second gel-forming technique described above). Such an arrangement provides a good combination of top-to-bottom flow and shear in the mixing vessel and results in good wetting of the gelling agent by the phase-change material.

Referring now to FIG. 1, there is shown a front view, broken away in part, of a first embodiment of a thermal exchange implement for use in maintaining a temperature-sensitive material within a desired temperature range, the thermal exchange implement being constructed according to the teachings of the present invention and being represented generally by reference numeral 11.

Thermal exchange implement 11 may comprise a sealed pouch 15. Pouch 15, which may be a flexible structure made by sealing together one or more laminate sheets each comprising an inner polyethylene layer and at least one outer barrier layer, may be shaped to define an interior cavity 19. A quantity of a gel 21, which may be, for example, a gel of the type described above that comprises at least one phase change material, such as n-tetradecane, n-hexadecane, or mixtures thereof, and at least one gelling agent, such as an SEBS or SEPS copolymer, may be disposed within cavity 19.

Thermal exchange implement 11 may be used similarly to a conventional ice/cold pack to keep temperature-sensitive materials within a desired temperature range.

Figure 2:
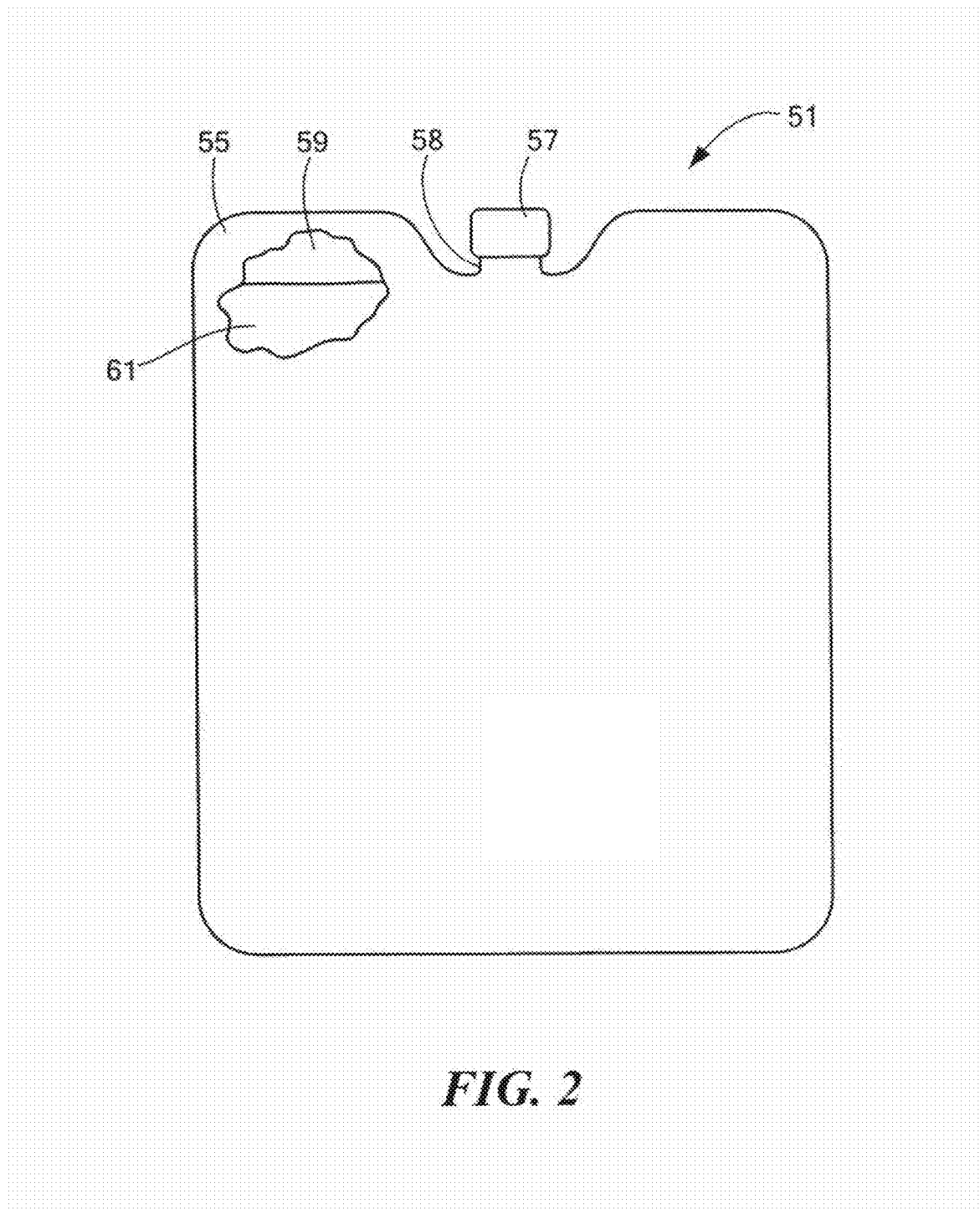
FIG. 2 is a front view, broken away in part, of a second embodiment of a thermal exchange implement for use in maintaining a temperature-sensitive material within a desired temperature range, the thermal exchange implement being constructed according to the teachings of the present invention.

Referring now to FIG. 2, there is shown a front view, broken away in part, of a second embodiment of a thermal exchange implement for use in maintaining a temperature-sensitive material within a desired temperature range, the thermal exchange device being constructed according to the teachings of the present invention and being represented generally by reference numeral 51.

Thermal exchange implement 51 may comprise a bottle 55 and a cap 57, cap 57 being securely mounted, for example, by screwing, on a neck 58 of bottle 55. Bottle 55, which may be a rigid structure molded from a polymer, such as polyethylene, may be shaped to define an interior cavity 59. A quantity of a gel 61, which may be, for example, a gel of the type described above that comprises at least one phase-change material, such as n-tetradecane, n-hexadecane, or mixtures thereof, and at least one gelling agent, such as an SEBS or SEPS copolymer, may be disposed within cavity 59.

Thermal exchange implement 51 may be used similarly to thermal exchange implement 11 to keep temperature-sensitive materials within a desired temperature range.

The following examples are provided for illustrative purposes only and are in no way intended to limit the scope of the present invention:

Example 1

Gel Comprising n-Tetradecane and Kraton™ G1654 SEBS Triblock Copolymer (Mixed at 40° C.)

Materials and Equipment

N-tetradecane (n-TD, $C_{14}H_{30}$, CAS#629-59-4, density=0.767 g/cc, purity 98%+, F.P. 99° C.) was procured from a commercial supplier and was used as supplied. Kraton™ G1654 powder (triblock SEBS co-polymer w/hydrogenated ethylene/butylene midblock, styrene:rubber ratio of 33:67% by weight, density=0.91 g/cc) was procured from Kraton Polymers (Houston, Tex.) and was used as received.

Figure 3:
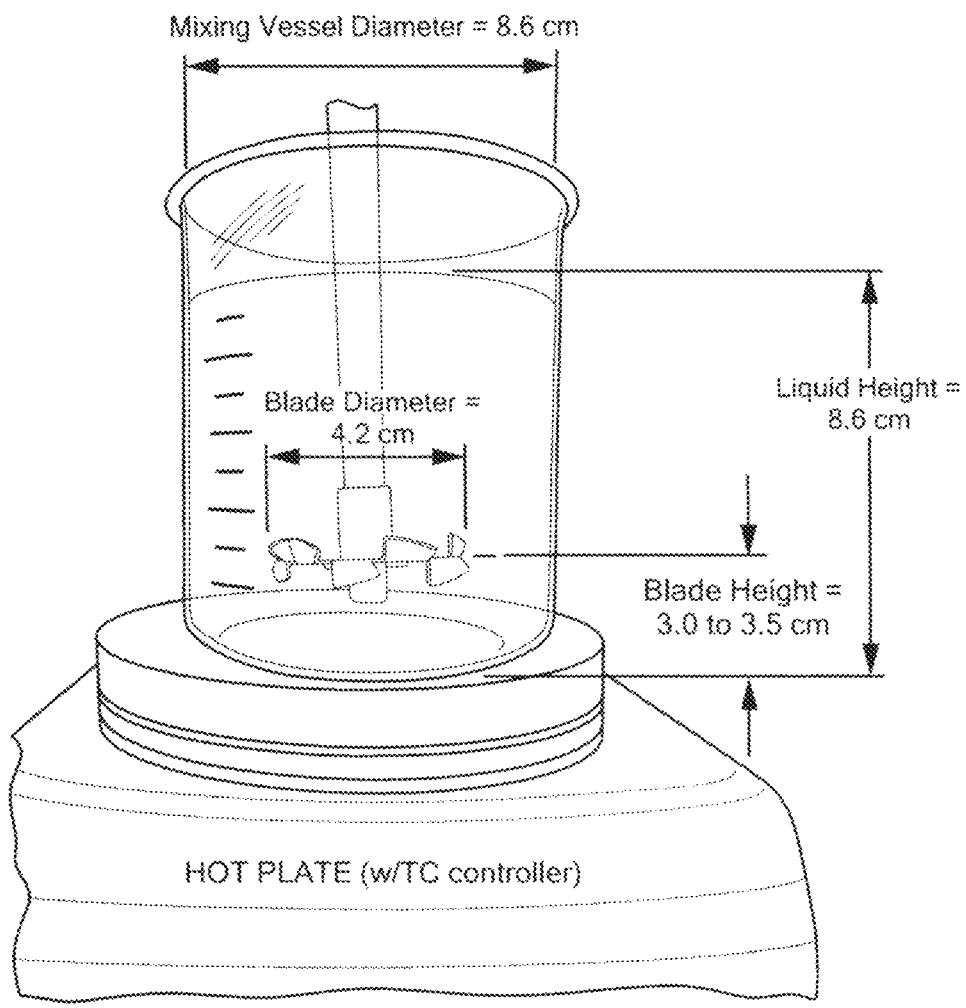
FIGS. 3 and 4 are front perspective and top perspective views, respectively, of the mixing setup used in Examples 1 through 4 and in Comparative Example 1.
Figure 4:
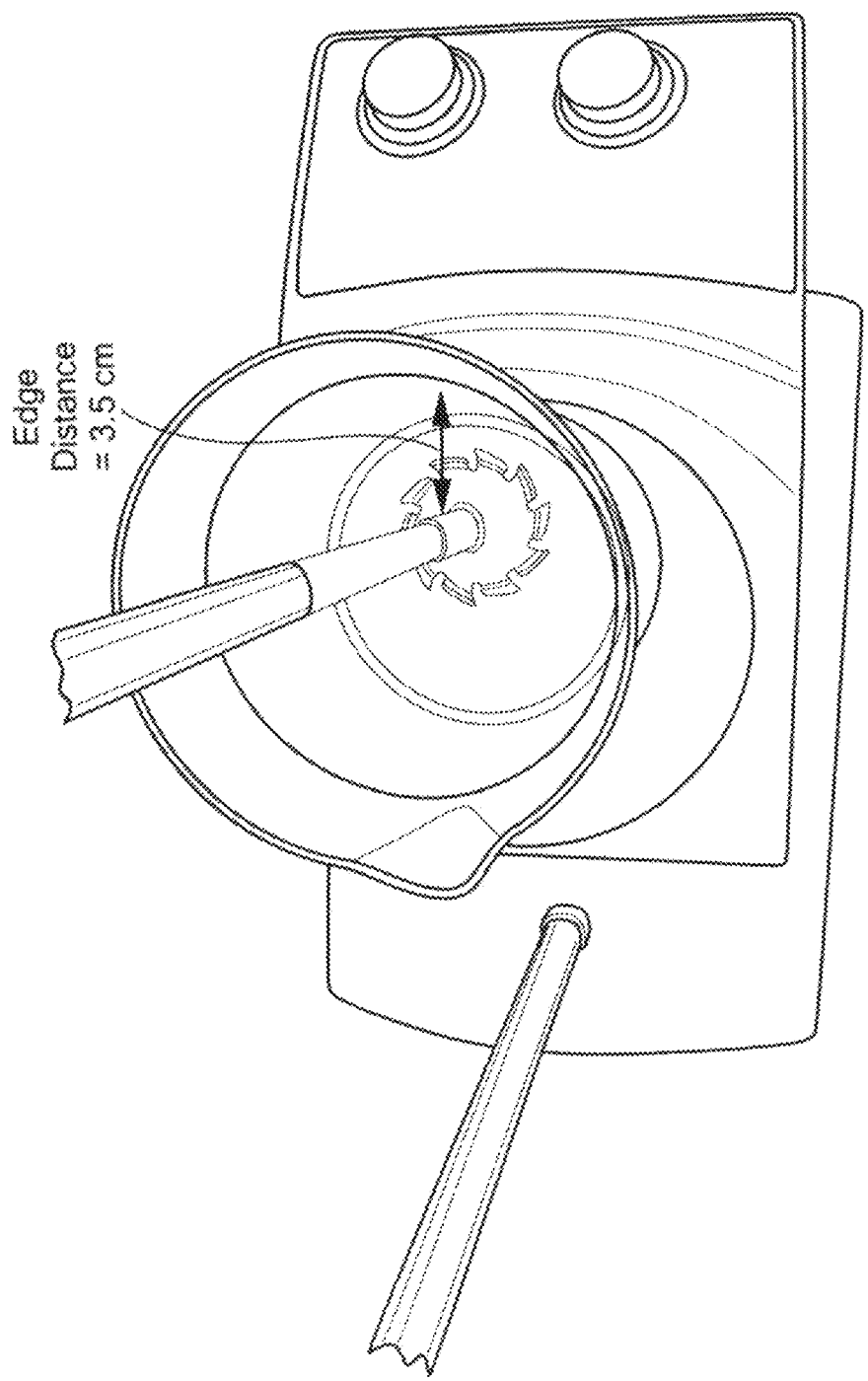

Multiple experiments were completed at laboratory scale to demonstrate proof of concept for the desired mixing system. The experimental laboratory setup is shown in FIGS. 3 and 4.

Description of Mixing Process

The mixing process was performed using an IKA RC hotplate (IKA, Wilmington, N.C.) with temperature feedback control loop, an IKA RW20 (overhead stirrer) mixer (IKA, Wilmington, N.C.) and an IKA R1303 (blade) stirrer (IKA, Wilmington, N.C.).

- A 500 ml beaker was filled with approximately 360 grams (470 ml) of n-tetradecane (n-TD).
- The IKA hot plate was set to +40° C. The control loop kept the temperature of the system at 40° C.±2° C. at all times.
- The RW20 mixer was set to 1300 RPM (R1303 tip speed of ~2.9 meters/sec), while the n-TD liquid was heated.
- Once at temperature, Kraton™ G1654 powder (amount=18 grams, or 5% wt of n-TD) was added into the vortex of the fluid, and the RW20 mixer was maintained at 1300 RPM for about 7 minutes.
- As the viscosity began to increase, the RW20 mixer speed was increased to 2400 RPM (R1303 tip speed of 5.3 m/sec), gradually over a 2 minute time period. The RW 20 mix speed remained at 2400 RPM for an additional 10 minutes, until the viscosity was too high for flow to occur (>10,000+ centipoise, based on RW20 capability).
- At that time, both the RW20 mixer and the IKA hot plate were shut off.

Figure 5:
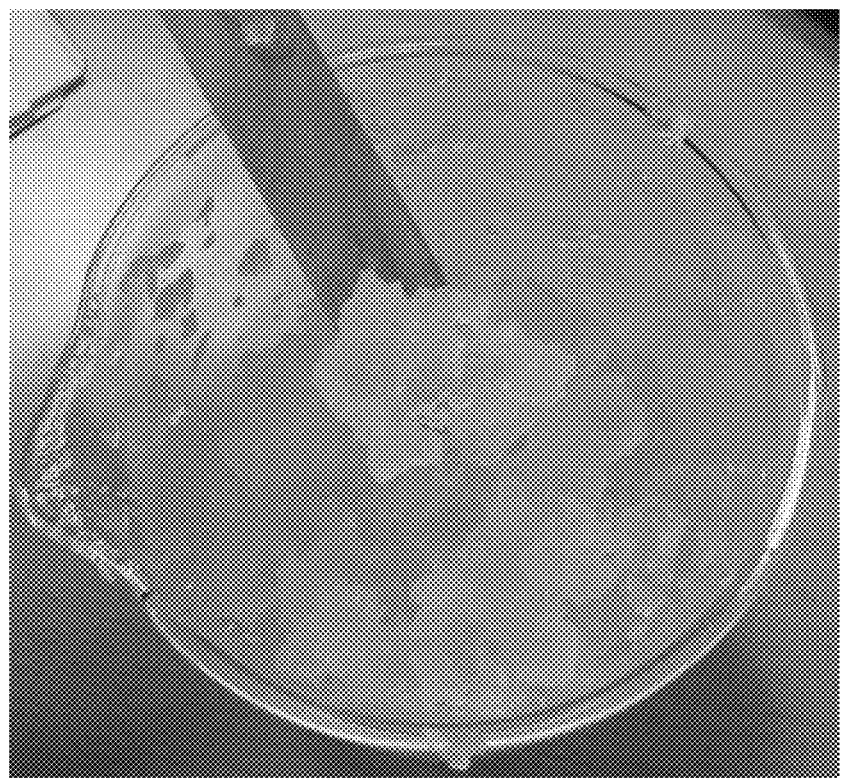
FIG. 5 is a photo of a quantity of the gel prepared in Example 1.

After cooling to room temperature, the mixture was stored for further analysis. A photograph of the resulting mixture is shown in FIG. 5. As can be seen in FIG. 5, the resulting mixture was not a clear, homogeneous solution.

Example 2

Gel Comprising n-Tetradecane and Kraton™ G1651 SEBS Triblock Copolymer (Mixed at 55° C.)

The same procedure as in Example 1 was used, except that (1) Kraton™ G1651 powder (triblock SEBS co-polymer w/hydrogenated ethylene/butylene midblock, styrene:rubber ratio of 30:70% by weight, density=0.91 g/cc) was used in place of Kraton™ G1654 powder, (2) the control loop kept the temperature of the system at 55° C.±1° C. at all times, and (3) the mix speed was varied until a gel of viscosity similar to that of Example 1 was obtained.

Example 3

Gel Comprising n-Tetradecane and Kraton™ G1660 SEBS Triblock Copolymer (Mixed at 42° C.)

The same procedure as in Example 1 was used, except that (1) Kraton™ G1660 powder (triblock SEBS co-polymer w/hydrogenated ethylene/butylene midblock, styrene:rubber ratio of 31:69% by weight, density=0.91 g/cc) was used in place of Kraton™ G1654 powder, (2) the control loop kept the temperature of the system at 42° C.±2° C. at all times, and (3) the mix speed was varied until a gel of viscosity similar to that of Example 1 was obtained.

Example 4

Gel Comprising n-Tetradecane and SEPTON™ S2005 SEPS Triblock Copolymer (Mixed at 40° C.)

The same procedure as in Example 1 was used, except that (1) SEPTON™ S2005 powder (triblock SEPS co-polymer w/hydrogenated ethylene/propylene midblock, styrene:rubber ratio of 20:80% by weight, density=0.89 g/cc) was used in place of Kraton™ G1654 powder, (2) the control loop kept the temperature of the system at 40° C.±1° C. at all times, and (3) the mix speed was varied over a 24 minute period, until a gel of viscosity similar to that of Example 1 was obtained.

Example 5

Testing of Various Gels (Mixed Above Room Temperature)

Gels comprising Kraton™ G1654 SEBS and n-tetradecane that were made using methods similar to those described in Example 1 were evaluated for their use as phase-change materials. Tables 1, 2 and 3 below summarize the performance of these gels, which were prepared at different copolymer concentrations and mixing conditions, and also summarize the performance of samples that did not include a gelling agent.

TABLE 1

| Freeze and Thaw Phase Change Temperature | | |
|---|---|---|
| Sample Material/Manufacturer | Thaw PCT [C.] | Freeze PCT [C.] |
| 3% wt G1654 | 5.0 | 4.2 |
| 4% wt G1654 | 4.9 | 4.0 |
| 5% wt G1654 | 5.0 | 4.2 |
| Average: | 4.9 | 4.1 |
| 5% wt G1654 #1 | 5.6 | 4.2 |
| 5% wt G1654 #2 | 5.3 | 4.8 |
| 5% wt G1654 #3 | 5.7 | 3.9 |
| 5% wt G1654 #4 | 5.3 | 5.0 |
| Average: | 5.5 | 4.5 |
| Pure n-TD #1 | 5.6 | 5.0 |
| Pure n-TD #2 | 5.7 | 5.0 |
| Pure n-TD #3 | 5.6 | 5.1 |
| Pure n-TD #4 | 5.7 | 5.0 |
| Average: | 5.6 | 5.0 |

Table 1 shows the freeze/thaw temperature test results of the n-TD PCM gel. Table 2 shows how the PCM gel performed vs. a control (612A) gel pack, filled with a water-based, synthetic polyacrylic acid (PAA) gel. Each gel pack tested was punctured with a specific hole size, and subjected to a load of 1.5 psi for 60 seconds. The gels were also evaluated for both free standing (liquid n-TD) and ability to pass the freeze/thaw test (no syneresis after 10 Freeze/Thaw cycles, each cycle comprising a soak at −5° C. for 6 hours, followed by a soak at +15° C. for 6 hours). Table 3 is a summary of DSC test results comparing the latent heat of the n-TD PCM gel to the parent (liquid only) n-TD used to make the gel. As is shown in Tables 1, 2 and 3, the 5% wt Kraton™ G1654/n-TD PCM met or exceeded the following criteria:

Amount of Gelling Agent: a copolymer concentration of 5% wt is feasible

Gel Freeze/Thaw cycling: Showed passing results at n=10(+) cycles

Gel Performance: Leakage performance exceeds synthetic polyacrylic acid (PAA) water-based gels; the n-TD PCM gel retained approximately 95% of the original (parent liquid n-TD) latent heat.

Gel Processing: Preparation at +40° C. demonstrated, at short mix times (15 minutes)

Gel Operating Temperature: The gelled PCM remains unchanged during cycling from −20° C. to +40° C.

Gel Freeze Point Depression: The gelled PCM freeze/thaw points are within specification Gel Shear Thinning: The gel does not shear thin enough to markedly lower its viscosity

TABLE 2

| ID# | % wt thick- ener | Mixing Condi- tions | Hole size allowing 1% wt loss* | % wt. Loss (1.5 psi for 60 sec)* | Free (liquid) n-TD in sample? | Freeze/ Thaw Test Result (10 cycles) |
|---|---|---|---|---|---|---|
| 1 | 0% | N/A | 31 mil | >30% | YES | Pass |
| 2 | 3% | 15 min, 40° C. | 40 mil | 5.7% | YES | Fail |
| 3 | 4% | 15 min, 40° C. | 60 mil | 1.50% | YES | Fail |
| 4a | 5%** | 4 hrs, 22° C. | 60 mil | 1.20% | YES | Fail |
| 4b | 5% | 5 min, 90° C. | NA | NA | NO*** | Fail |
| 5 | 5% | 5 min, 40° C. | 40 mil | ~2% | YES | Pass |
| 6 | 5% | 10 min, 40° C. | 40 mil | 1.0% | YES | Pass |
| 7 | 5% | 15 min, 40° C. | 81(+) mil | 0.5% | NO | Pass |
| 8 | Control [syn- thetic] | N/A | 60 mil | 3.6% | NO Free Liquid ($H_2O$) | Pass |

*612A Gel pack (6" × 5½" × 1") was exposed to ~1.5 psi for 60 sec
**This mixture had 30-40% liquid n-TD as a separate layer. Performance is due to hole "self sealing" and is not a viable approach
***Although the process made a very rubbery n-TD gel, it failed the F/T test

TABLE 3

SUMMARY of DSC Results: Liquid n-TD vs. Gelled (5% wt Kraton™ G1654) n-TD

| Sample Description (Lot#, Number of Samples Tested) | AVG Onset (thaw) (Deg C.) | AVG PEAK (thaw) (Deg C.) | AVG LH (thaw) (J/g) |
|---|---|---|---|
| 98% + Pure n-TD (Lot# 20120301), (n = 2): | 4.8 | 6.0 | 225.4 |
| 5% Gelled n-TD (Lot# 20120301), (n = 3): | 3.8 | 8.2 | 213.5 |

Comparative Example 1

Gel Comprising n-Tetradecane and "Gelled" PLUSICE A4 Rubber from PCM Products

A sample of "Gelled" PLUSICE A4 (organic PCM) Rubber was obtained from PCM Products (Hertfordshire, UK). The sample was rotary evaporated such that only (solid) gelling agent remained. 5% wt of the solid gelling agent was fully dissolved in n-tetradecane, using the setup described in Example 1, at elevated temperatures (75° C.+), to make a homogeneous solution (no transition temperature was found). After cooling to room temperature, the resulting gel was an opaque rubbery solid. The opaque solid was subjected to the 10 cycle freeze/thaw test (as described in Example 5). After being subjected to the freeze/thaw test, the 5% wt "gelled" PLUSICE A4 Rubber showed a sizeable volume of liquid n-tetradecane separated from the starting material (i.e., the material failed the freeze/thaw test).

Example 6

Gel Comprising n-Tetradecane and Kraton™ G1654 SEBS Triblock Copolymer (Mixed at Room Temperature)

Materials and Equipment

N-tetradecane (n-TD, $C_{14}H_{30}$, CAS#629-59-4, density=0.767 g/cc, purity 98%+, F.P. 99° C.) was procured from a commercial supplier and then dyed green by applicant. Kraton™ G1654 powder (triblock SEBS co-polymer w/hydrogenated ethylene/butylene midblock, styrene:rubber ratio of 33:67% by weight, density=0.91 g/cc) was procured from Kraton Polymers (Houston, Tex.) and was used as received.

Multiple experiments were completed at laboratory scale to demonstrate proof of concept for the mixing system at room temperature. The experimental laboratory setup was similar to that shown in FIGS. 3 and 4, the principal differences being that the liquid height was 7.1 cm, instead of 8.6 cm, the blade diameter was 5.0 cm, instead of 4.2 cm, the blade height was 3.2 cm, instead of 3.0 to 3.5 cm, and the edge distance was 4.3 cm, instead of 3.5 cm.

Description of Mixing/Thermal Cycling Process

The mixing was performed using an IKA RW20 (overhead stirrer) mixer and a 2" diameter cowles blade.

A 500 ml beaker was filled with approximately 300 grams (400 ml) of dyed n-tetradecane phase-change material at room temperature.

The RW20 mixer was set to 600 RPM (tip speed of ~1.2 meters/sec), and Kraton™ G1654 powder (amount=15 grams, or 5% wt of the dyed phase-change material) was added into the vortex of the fluid, and the RW20 mixer was maintained at 600 RPM for about 15 minutes.

The RW20 mixer speed was increased to 800 RPM (tip speed of 2.1 m/sec), after 15 minutes and remained at 800 RPM for an additional 5 minutes, until the mixture was visibly consistent throughout its volume. The mixing temperature was maintained at 22° C.+/−2° C. at all times.

After a total elapsed time of 20 minutes, the RW20 mixer was shut off

The resulting product was allowed to sit at 22° C.+/−3° C. for 20 hours, such that the polymer (G1654) rich portion of the non-homogeneous mixture visibly showed additional swelling.

At the 20 hour mark, the non-homogeneous mixture was poured into an 8"×8" PYREX® glass pan and immediately subjected to the following thermal cycle: Ramp from 22° C. to 60° C. in 3 hours, 60° C. soak for 16 hours, cool from 60° C. to 22° C. in 3 hours. The thermal cycle temperature was maintained within +/−1° C. of set point at all times.

Figure 6:
FIG. 6 is a photo of the gel prepared in Example 6.

After cooling to room temperature, the gel was stored for further analysis. A photograph of the resulting gel, which is a tough, transparent, rubbery elastic solid, is shown in FIG. 6.

Example 7

Gel Comprising n-Hexadecane and Kraton™ G1654 SEBS Triblock Copolymer (Mixed at Room Temperature)

Figure 7:
FIG. 7 is a photo of the gel prepared in Example 7.

N-hexadecane (n-HD, $C_{16}H_{34}$, CAS#544-76-3, density=0.773 g/cc, purity 94%+, F.P. 135° C.) was procured from a commercial supplier and then was dyed orange by applicant. Kraton™ G1654 powder (triblock SEBS co-polymer w/hydrogenated ethylene/butylene midblock, styrene:rubber ratio of 33:67% by weight, density=0.91 g/cc) was procured from Kraton Polymers (Houston, Tex.) and was used as received. The gelling agent and phase-change material were subjected to an identical mixing process as described in Example 6. The thermal cycling process was modified as follows: Ramp from 22° C. to 65° C. in 3.5 hours, 65° C. soak for 16 hours, cool from 65° C. to 22° C. in 3.5 hours. After cooling to room temperature, the gel was stored for further analysis. A photograph of the resulting gel, which is a tough, transparent, rubbery elastic solid, is shown in FIG. 7.

Example 8

Gel Comprising n-Tetradecane/n-Hexadecane Mixture and Kraton™ G1654 SEBS Triblock Copolymer (Mixed at Room Temperature)

Figure 8:
FIG. 8 is a photo of the gel prepared in Example 8.

N-tetradecane and n-hexadecane were procured from commercial suppliers. Applicant combined the n-tetradecane and n-hexadecane in appropriate amounts to yield a phase change composition having a phase change temperature of about 3° C., which phase change composition was then dyed purple by applicant. Kraton™ G1654 powder (triblock SEBS co-polymer w/hydrogenated ethylene/butylene midblock, styrene:rubber ratio of 33:67% by weight, density=0.91 g/cc) was procured from Kraton Polymers (Houston, Tex.) and was used as received. The gelling agent and the phase change composition were subjected to identical mixing and thermal cycling processes as described in Example 6. After cooling to room temperature, the gel was stored for further analysis. A photograph of the resulting gel, which is a tough, transparent, rubbery elastic solid, is shown in FIG. 8.

Example 9

Gel Comprising n-Tetradecane/n-Hexadecane Mixture and Kraton™ G1654 SEBS Triblock Copolymer (Mixed at Room Temperature)

Figure 9:
FIG. 9 is a photo of the gel prepared in Example 9.

N-tetradecane and n-hexadecane were procured from commercial suppliers. Applicant combined the n-tetradecane and n-hexadecane in appropriate amounts to yield a phase change composition having a phase change temperature of about 7° C., which phase change composition was then dyed light blue by applicant. Kraton™ G1654 powder (triblock SEBS co-polymer w/hydrogenated ethylene/butylene midblock, styrene:rubber ratio of 33:67% by weight, density=0.91 g/cc) was procured from Kraton Polymers (Houston, Tex.) and was used as received. The gelling agent and the phase change composition were subjected to identical mixing and thermal cycling processes as described in Example 6. After cooling to room temperature, the gel was stored for further analysis. A photograph of the resulting gel, which is a tough, transparent, rubbery elastic solid, is shown in FIG. 9.

Example 10

Gel Comprising n-Tetradecane and Kraton™ G1651 SEBS Triblock Copolymer (Mixed at Room Temperature)

The same procedure as in Example 6 was used, except that (1) Kraton™ G1651 powder (triblock SEBS co-polymer w/hydrogenated ethylene/butylene midblock, styrene:rubber ratio of 30:70% by weight, density=0.91 g/cc) was used in place of Kraton™ G1654 powder and (2) the non-homogeneous mixture was subjected to the thermal cycle without being removed from the 500 ml beaker in which it was mixed. After the thermal cycle was completed, a gel of viscosity similar to that of Example 6 was obtained.

Example 11

Gel Comprising n-Tetradecane and Kraton™ G1660 SEBS Triblock Copolymer (Mixed at Room Temperature)

The same procedure as in Example 6 was used, except that (1) Kraton™ G1660 powder (triblock SEBS co-polymer w/hydrogenated ethylene/butylene midblock, styrene:rubber ratio of 31:69% by weight, density=0.91 g/cc) was used in place of Kraton™ G1654 powder and (2) the non-homogeneous mixture was subjected to the thermal cycle without being removed from the 500 ml beaker in which it was mixed. After the thermal cycle was completed, a gel of somewhat reduced viscosity compared to that of Example 6 was obtained.

Example 12

Gel Comprising n-Tetradecane and SEPTON™ S2005 SEPS Triblock Copolymer (Mixed at Room Temperature)

The same procedure as in Example 6 was used, except that (1) SEPTON™ S2005 powder (triblock SEPS co-polymer w/hydrogenated ethylene/propylene midblock, styrene:rubber ratio of 20:80% by weight, density=0.89 g/cc) was used in place of Kraton™ G1654 powder and (2) the non-homogeneous mixture was subjected to the thermal cycle without being removed from the 500 ml beaker in which it was mixed. After the thermal cycle was completed, a gel of viscosity similar to that of Example 6 was obtained.

Example 13

Thermal Exchange Implement Comprising n-Tetradecane and Kraton™ G1654 SEBS Triblock Copolymer, in a Flexible Pouch (Mixed at Room Temperature)

Figure 10:
FIG. 10 is a photo of the thermal exchange implement prepared in Example 13.

The same procedure as in Example 6 was used, except that (1) the beaker size was increased to 2000 ml and the batch size was increased to 1600 ml; (2) the mixing process was repeated to make 2.5 gallons of the non-homogeneous mixture; (3) the non-homogeneous mixture was stored in a 5 gallon container for 16 hours prior to being used; and (4) the 2.5 gallons of non-homogeneous mixture was run through a conventional VFFS machine such that 11 of Cold Chain Technologies, Inc.'s part number 732M16 flexible pouch saddlebags were filled. As they were filled with the non-homogeneous mixture, each individual pouch was sealed using the proper VFFS settings of pressure, temperature and time. All sealed flexible pouches were subjected to the thermal cycle described in Example 6. After cooling to room temperature, the gel-containing flexible pouches (i.e., thermal exchange implements) were stored for further analysis. A photograph of a single such thermal exchange implement, measuring 7"×4"×½ ", is shown in FIG. 10.

Example 14

Gel Comprising n-Tetradecane and 10% by Weight Kraton™ G1654 SEBS Triblock Copolymer (Mixed at Room Temperature)

The same procedure as in Example 6 was used except that (1) the RW20 mixer was set to 1200 RPM and 30 grams (or 10% wt of n-tetradecane) was added into the vortex of the fluid and (2) the RW20 mixer speed was increased to 1600 RPM after 15 minutes and remained at that speed for an additional 5 minutes (until the mixture was visibly consistent throughout its volume). The resulting non-homogeneous mixture was allowed to sit, and was then subjected to the thermal cycle shown in Example 6. After being cooled to room temperature, the gel was a very tough, translucent, rubbery elastic solid.

Example 15

Evaluation of CarboxyMethyl-Cellulose (CMC) Hydro-Gel Based Refrigerants (P/N 508A)

Cold Chain Technologies, Inc. gel pack refrigerants (P/N 508A) were made by mixing room temperature plant water with about 1.5% wt of CMC powder for up to 15 minutes and pumping the mixture through a standard VFFS production machine, where gel packs were formed, filled and sealed using the proper settings of pressure, temperature and time. Individual refrigerant gel packs, measuring 5.75"×4.5"×1", were loaded into corrugate cases (72 per case) and then palletized. After chemical crosslinking was completed (~12 hours), the palletized product was inspected for leaks, and when none were found, was placed into inventory. One case of palletized 508A CMC gel pack refrigerants was taken from inventory and the refrigerants were evaluated in freeze/thaw testing (as in Example 5) and in compression testing (as in Example 16). The results of this testing, summarized in Table 4, confirm that the G1654 based PCM gels of the present application perform equal to or better than their CMC-based hydrogel counterparts.

Example 16

Testing of Various Gels and Thermal Exchange Implements (Gels Mixed at Room Temperature)

Gels comprising Kraton™ G1654 SEBS and dyed n-tetradecane and/or n-hexadecane made using methods similar to those described in Example 6 were evaluated for their use as phase-change materials. Thermal exchange implements made using methods similar to those in Example 13 were also evaluated. Table 4, below, summarizes the performance of these gels and Thermal Exchange Implements, which were subjected to both freeze/thaw and compression testing. Specifically, each gel was subjected to a load of 1.5 psi for 24 hours and then evaluated for syneresis (free standing liquid PCM in the sample container) as well as their ability to pass the freeze/thaw test (no syneresis after 10 Freeze/Thaw cycles), with one cycle defined as 6 hours at −20° C., followed by 6 hours at +40° C. As is shown in Table 4, the 5% wt Kraton™ G1654 gelling agent based PCMs, as well as the Thermal Exchange Implements, met all key criteria and performed equal to or better than Cold Chain Technologies, Inc.'s conventional CMC-based refrigerants.

TABLE 4

| EX # | Gelling Agent: Concentration | PCM Type | Mix/Swell Cycle (mixing at room temperature) | Thermal Cycle (ramp/soak/ramp) | Free Liquid in Gel as made? | Syneresis Test (1.5 psi for 24 hours)* | F/T Test (n = 10 cycles) ** |
|---|---|---|---|---|---|---|---|
| 6 | G1654: 5% wt | 5° C. | 600 RPM for 15 min, 800 RPM for 5 min, sit for 20 hrs. | 22° C./60° C./22° C. 3 hrs/16 hrs/3 hrs | NO | PASS | PASS |
| 7 | G1654: 5% wt | 17° C. | 600 RPM for 15 min, 800 RPM for 5 min, sit for 20 hrs. | 22° C./65° C./22° C. 3.5 hrs/16 hrs/3.5 hrs | NO | PASS | PASS |
| 8 | G1654: 5% wt | 3° C. | 600 RPM for 15 min, 800 RPM for 5 min, sit for 20 hrs. | 22° C./60° C./22° C. 3 hrs/16 hrs/3 hrs | NO | PASS | PASS |
| 9 | G1654: 5% wt | 7° C. | 600 RPM for 15 min, 800 RPM for 5 min, sit for 20 hrs. | 22° C./60° C./22° C. 3 hrs/16 hrs/3 hrs | NO | PASS | PASS |
| 10 | G1651: 5% wt | 5° C. | 600 RPM for 15 min, 800 RPM for 5 | 22° C./60° C./22° C. 3 hrs/16 hrs/3 hrs | NO | Not Tested | Not Tested |

TABLE 4-continued

| EX # | Gelling Agent: Concentration | PCM Type | Mix/Swell Cycle (mixing at room temperature) | Thermal Cycle (ramp/soak/ramp) | Free Liquid in Gel as made? | Syneresis Test (1.5 psi for 24 hours)* | F/T Test (n = 10 cycles) ** |
|---|---|---|---|---|---|---|---|
| 11 | G1660: 5% wt | 5° C. | 600 RPM for 15 min, 800 RPM for 5 min, sit for 20 hrs. | 22° C./60° C./22° C. 3 hrs/16 hrs/3 hrs | NO | Not Tested | Not Tested |
| 12 | S2005: 5% wt | 5° C. | 600 RPM for 15 min, 800 RPM for 5 min, sit for 20 hrs. | 22° C./60° C./22° C. 3 hrs/16 hrs/3 hrs | NO | Not Tested | Not Tested |
| 13 | G1654: 5% wt | 5° C. | 600 RPM for 15 min, 800 RPM for 5 min, sit for 16 hrs. | 22° C./60° C./22° C. 3 hrs/16 hrs/3 hrs | NO | PASS | PASS |
| 14 | G1654: 10% wt | 5° C. | 1200 RPM for 15 min, 1600 RPM for 5 min, sit for 20 hrs. | 22° C./60° C./22° C. 3 hrs/16 hrs/3 hrs | NO | PASS*** | PASS |
| 15 | CMC: 1.5% wt (control) | 0° C. (Water) | Not Applicable: See Example 15 write-up | Not Applicable | NO | PASS | FAIL |

*Although no syneresis was seen, 5% wt samples did show slight permanent deformation post test (CMC showed significant deformation)
** Samples that passed freeze/thaw testing showed reduced mechanical properties (reduced toughness) upon post test inspection.
***10% wt, 5° C. PCM gel subjected to a loading of 1.5 psi for 24 hours did not exhibit any permanent deformation.

The embodiments of the present invention recited herein are intended to be merely exemplary and those skilled in the art will be able to make numerous variations and modifications to it without departing from the spirit of the present invention. All such variations and modifications are intended to be within the scope of the present invention as defined by the claims appended hereto.

What is claimed is:

1. A gel comprising a phase-change material and a gelling agent, wherein the phase-change material is at least one organic phase-change material selected from the group consisting of n-tetradecane, n-hexadecane, n-octadecane, and mixtures thereof, wherein the gelling agent constitutes up to about 10%, by weight, of the gel, the gel being formed by (a) mixing the phase-change material and the gelling agent at an intermediate temperature that is above room temperature but is below the flash point of the phase-change material and at which the gelling agent partially, but not completely, dissolves in the phase-change material, whereby a non-homogeneous mixture is produced, and (b) then, cooling the non-homogeneous mixture to room temperature, whereby the gel is formed, the gel being non-homogenous.

2. The gel as claimed in claim 1 wherein the at least one organic phase-change material is n-tetradecane and/or n-hexadecane.

3. The gel as claimed in claim 1 wherein the gelling agent is at least one saturated olefin rubber.

4. The gel as claimed in claim 3 wherein the gelling agent is at least one hydrogenated styrenic block copolymer.

5. The gel as claimed in claim 4 wherein the gelling agent is at least one styrene-ethylene-butylene-styrene (SEBS) tri-block copolymer.

6. The gel as claimed in claim 5 wherein the gelling agent is at least one high molecular weight styrene-ethylene-butylene-styrene tri-block copolymer with a styrene:rubber ratio in the range of about 30:70 to 33:67 by weight.

7. The gel as claimed in claim 4 wherein the gelling agent is at least one styrene-ethylene-propylene-styrene (SEPS) tri-block copolymer.

8. The gel as claimed in claim 7 wherein the gelling agent is at least one high molecular weight styrene-ethylene-propylene-styrene tri-block copolymer with a styrene:rubber ratio of about 20:80 by weight.

9. The gel as claimed in claim 1 wherein the phase-change material is n-tetradecane and wherein the gelling agent is a high molecular weight styrene-ethylene-butylene-styrene tri-block copolymer with a styrene:rubber ratio in the range of about 30:70 to 33:67 by weight.

10. A thermal exchange implement, the thermal exchange implement comprising:
(a) the gel of claim 1; and
(b) a container, the container holding a quantity of the gel.

11. A gel comprising a phase-change material and a gelling agent, wherein the phase-change material is n-tetradecane, wherein the gelling agent is a high molecular weight styrene-ethylene-butylene-styrene tri-block copolymer with a styrene:rubber ratio in the range of about 30:70 to 33:67 by weight, and wherein the gelling agent constitutes up to about 10%, by weight, of the gel, with the phase-change material constituting the remainder of the gel, the gel being formed by (a) mixing the phase-change material and the gelling agent at an intermediate temperature that is above room temperature but is below the flash point of the phase-change material and at which the gelling agent partially, but not completely, dissolves in the phase-change material, whereby a non-homogeneous mixture is produced, and (b) then, cooling the non-homogeneous mixture to room temperature, whereby the gel is formed, the gel being non-homogeneous.

12. The gel as claimed in claim 11 wherein the gelling agent constitutes less than 6%, by weight, of the gel, with the phase-change material constituting the remainder of the gel.

13. The gel as claimed in claim 12 wherein the temperature at which the phase-change material and the gelling agent are mixed together is in the range of about 40° C. to about 55° C.

14. A gel comprising a phase-change material and a gelling agent, wherein the phase-change material is selected from the group consisting of n-tetradecane, n-hexadecane, n-octadecane, and mixtures thereof, wherein the gelling agent is a high molecular weight styrene-ethylene-butylene-styrene tri-block copolymer with a styrene:rubber ratio of about 33:67 by weight and wherein the gelling agent constitutes up to about 10%, by weight, of the gel, the gel being formed by (a) mixing the phase-change material and the gelling agent at a first temperature at which the phase-change material is in a liquid state and which is below the flash point of the phase-change material, wherein the first temperature is in the range of about 15° C. to about 30° C., and at which the mixture is not a viscoelastic liquid, whereby a non-homogenous mixture is produced; (b) then, heating the non-homogeneous mixture to a second temperature that is below the flash point of the phase-change material and at which a viscoelastic liquid is formed; and (c) then, cooling the viscoelastic liquid to room temperature.

15. A gel comprising a phase-change material and a gelling agent, wherein the phase-change material is a mixture of n-tetradecane and n-hexadecane and the gelling agent is a high molecular weight styrene-ethylene-butylene-styrene tri-block copolymer with a styrene:rubber ratio in the range of about 30:70 to 33:67 by weight, wherein the gelling agent constitutes up to about 10%, by weight, of the gel, the gel being formed by (a) mixing the phase-change material and the gelling agent at a first temperature at which the phase-change material is in a liquid state and which is below the flash point of the phase-change material and at which the mixture is not a viscoelastic liquid, whereby a non-homogeneous mixture is produced; (b) then, heating the non-homogeneous mixture to a second temperature that is below the flash point of the phase-change material and at which a viscoelastic liquid is formed; and (c) then, cooling the viscoelastic liquid to room temperature.

16. A thermal exchange implement, the thermal exchange implement comprising:
    (a) the gel of claim 15; and
    (b) a container, the container holding a quantity of the gel.

17. A gel comprising a phase-change material and a gelling agent, wherein the phase-change material is a mixture of n-tetradecane and n-hexadecane, wherein the gelling agent is a high molecular weight styrene-ethylene-butylene-styrene tri-block copolymer with a styrene:rubber ratio in the range of about 30:70 to 33:67 by weight, wherein the gelling agent constitutes up to about 10%, by weight, of the gel, with the phase-change material constituting the remainder of the gel and wherein the gel is formed by (a) mixing the phase-change material and the gelling agent at a first temperature at which the phase-change material is in a liquid state and which is below the flash point of the phase-change material and at which the mixture is not a viscoelastic liquid, whereby a non-homogenous mixture is produced; (b) then, heating the non-homogeneous mixture to a second temperature that is below the flash point of the phase-change material and at which a viscoelastic liquid is formed; and (c) then, cooling the viscoelastic liquid to room temperature.

18. The gel as claimed in claim 17 wherein the gelling agent constitutes less than 6%, by weight, of the gel, with the phase-change material constituting the remainder of the gel.

19. A method of preparing a gel, the method comprising the steps of:
    (a) providing a phase-change material, wherein the phase-change material is at least one n-alkane;
    (b) providing a gelling agent, wherein the gelling agent constitutes up to about 10%, by weight, of the gel;
    (c) mixing the phase-change material and the gelling agent at an elevated temperature that is above room temperature but is below the flash point of the phase-change material and at which the gelling agent partially, but not completely, dissolves in the phase-change material, whereby a non-homogeneous mixture is produced; and
    (d) cooling the non-homogeneous mixture from the elevated temperature to room temperature.

20. A method of preparing a gel, the method comprising the steps of:
    (a) providing a phase-change material;
    (b) providing a gelling agent;
    (c) mixing the phase-change material and the gelling agent at a first temperature at which the phase-change material is in a liquid state and which is below the flash point of the phase-change material and at which the mixture is not a viscoelastic liquid, whereby a non-homogenous mixture is produced;
    (d) then, heating the non-homogeneous mixture to a second temperature that is below the flash point of the phase-change material and at which a viscoelastic liquid is formed; and
    (e) then, cooling the viscoelastic liquid to room temperature.

21. The method as claimed in claim 20 wherein the phase-change material is at least one organic phase-change material.

22. The method as claimed in claim 21 wherein the at least one organic phase-change material is at least one compound selected from the group consisting of n-alkanes, fatty acid esters, fatty alcohols, and fatty acids.

23. The method as claimed in claim 22 wherein the at least one organic phase-change material is selected from the group consisting of n-tetradecane, n-hexadecane, n-octadecane, and mixtures thereof.

24. The method as claimed in claim 20 wherein the phase-change material is n-tetradecane and/or n-hexadecane.

25. The method as claimed in claim 20 wherein the gelling agent is at least one saturated olefin rubber.

26. The method as claimed in claim 25 wherein the gelling agent is at least one hydrogenated styrenic block copolymer.

27. The method as claimed in claim 26 wherein the gelling agent is at least one styrene-ethylene-butylene-styrene (SEBS) tri-block copolymer.

28. The method as claimed in claim 27 wherein the gelling agent is at least one high molecular weight styrene-ethylene-butylene-styrene tri-block copolymer with a styrene:rubber ratio in the range of about 30:70 to 33:67 by weight.

29. The method as claimed in claim 20 wherein the phase-change material is n-hexadecane and the gelling agent is a high molecular weight styrene-ethylene-butylene-styrene tri-block copolymer with a styrene:rubber ratio in the range of about 30:70 to 33:67 by weight.

30. The method as claimed in claim 26 wherein the gelling agent is at least one styrene-ethylene-propylene-styrene (SEPS) tri-block copolymer.

31. The method as claimed in claim 30 wherein the gelling agent is at least one high molecular weight styrene-ethylene-propylene-styrene tri-block copolymer with a styrene:rubber ratio of about 20:80 by weight.

32. The method as claimed in claim 20 further comprising, after the mixing step and before the heating step, the step of allowing the non-homogenous mixture to rest for a period of time ranging from about 30 minutes to about 72 hours.

33. The method as claimed in claim 20 further comprising, after the mixing step, placing the non-homogeneous mixture in a thermal exchange implement container, and wherein the heating and cooling steps are performed on the non-homogeneous mixture while within the thermal exchange implement container.

34. The method as claimed in claim 20 wherein the first temperature is in the range of about 15° C. to about 30° C. and wherein the second temperature is between about 40° C. and about 80° C.

35. The method as claimed in claim 34 wherein the second temperature is between about 45° C. and about 65° C.

36. The method as claimed in claim 20 wherein said heating comprises a ramp phase in which the temperature is ramped from the first temperature to the second temperature and a constant phase in which the temperature is maintained at the second temperature.

37. The method as claimed in claim 36 wherein the ramp phase ranges from a rate of about 0.025° C./minute to about 2.5° C./minute.

38. The method as claimed in claim 36 wherein the ramp phase ranges from a rate of about 0.15° C./minute to about 0.30° C./minute.

39. The method as claimed in claim 36 wherein the constant phase ranges from about 0.5 hours to about 20 hours.

40. The method as claimed in claim 39 wherein the constant phase ranges from about 6 hours to about 16 hours.

41. The method as claimed in claim 20 wherein said cooling step comprises cooling at a rate of about 0.025° C./minute to about 2.5° C./minute.

42. The method as claimed in claim 20 wherein said cooling step comprises cooling at a rate of about 0.15° C./minute to about 0.30° C./minute.

43. The method as claimed in claim 20 wherein the first temperature is in the range of about 19° C. to about 25° C.

44. The method as claimed in claim 43 wherein the second temperature is in the range of about 40° C. to about 80° C. and wherein the cooling step comprises cooling the viscoelastic liquid from the second temperature to room temperature.

45. A method of preparing a thermal exchange implement, the method comprising the steps of:
    (a) providing a phase-change material;
    (b) providing a gelling agent;
    (c) mixing together the phase-change material and the gelling agent at an elevated temperature that is above room temperature but is below the flash point of the phase-change material and at which the gelling agent partially, but not completely, dissolves in the phase-change material, whereby a non-homogeneous mixture is produced;
    (d) then, cooling the non-homogeneous mixture from the elevated temperature to room temperature, whereby a gel is formed; and
    (e) depositing the gel in a thermal exchange implement container.

46. A method of preparing a thermal exchange implement, the method comprising the steps of:
    (a) providing a phase-change material;
    (b) providing a gelling agent;
    (c) mixing the phase-change material and the gelling agent at a first temperature at which the phase-change material is in a liquid state and which is below the flash point of the phase-change material and at which the mixture is not a viscoelastic liquid, whereby a non-homogenous mixture is produced;
    (d) then, depositing the non-homogeneous mixture in a thermal exchange implement container;
    (e) then, while the non-homogeneous mixture is in the thermal exchange implement container, heating the non-homogeneous mixture to a second temperature that is below the flash point of the phase-change material and at which the non-homogeneous mixture forms a viscoelastic liquid; and
    (f) then, while the viscoelastic liquid is in the thermal exchange implement container, cooling the viscoelastic liquid to room temperature.

* * * * *